US006240124B1

(12) United States Patent
Wiedeman et al.

(10) Patent No.: US 6,240,124 B1
(45) Date of Patent: May 29, 2001

(54) CLOSED LOOP POWER CONTROL FOR LOW EARTH ORBIT SATELLITE COMMUNICATIONS SYSTEM

(75) Inventors: Robert A. Wiedeman, San Jose; Michael J. Sites, Fremont, both of CA (US)

(73) Assignee: Globalstar L.P., San Jose, CA (US)

( * ) Notice: Subject to any disclaimer, the term of this patent is extended or adjusted under 35 U.S.C. 154(b) by 0 days.

(21) Appl. No.: 09/432,301

(22) Filed: Nov. 2, 1999

Related U.S. Application Data

(63) Continuation-in-part of application No. 08/832,644, filed on Apr. 4, 1997, now Pat. No. 6,097,752, which is a continuation of application No. 08/467,209, filed on Jun. 6, 1995, now Pat. No. 5,619,525.

(51) Int. Cl.[7] .................................................. A61F 2/06

(52) U.S. Cl. ...................... 375/130; 370/318; 455/13.4; 455/52

(58) Field of Search ............................. 375/130, 211, 375/221; 370/318; 455/13.4, 52

(56) References Cited

U.S. PATENT DOCUMENTS

| Re. 32,905 | 4/1989 | Baran .................................. 370/104 |
| 4,261,054 | 4/1981 | Scharla-Nielsen ..................... 455/12 |
| 4,309,764 | 1/1982 | Acampora ............................. 370/83 |

(List continued on next page.)

FOREIGN PATENT DOCUMENTS

| 0 421 698 A3 | 10/1991 | (EP) . |
| WO 81/00034 | 1/1981 | (WO) . |
| WO 87/03441 | 6/1987 | (WO) . |
| WO 90/13186 | 11/1990 | (WO) . |
| WO 91/09473 | 6/1991 | (WO) . |

OTHER PUBLICATIONS

A.G. Reed et al., "Interference In The Fixed Satellite Service Bands Between The Feeder–Links Of Networks Using Non–Geostationary Satellites And Networks Using Geostationary Satellites", Feb. 11, 1993, pp. 251–256.

B.R. Vojcic et al., "Power Control Versus Capacity of a CDMA System Operating Over a Low Earth Orbiting Satellite Link", Nov. 29, 1993, 5 pages.

Petition of American Mobile Satellite Corporation Before the FCC, Washington, DC 20554, dated Jun. 3, 1991, pp. 1–15.

Application of Motorola Satellite Communications, Inc. for IRIDIUM A Low Earth Orbit Mobile Satellite System before the FCC, Washington, D.C. Dec. 1990, pp. 49–96.

(List continued on next page.)

Primary Examiner—Don N. Vo
(74) Attorney, Agent, or Firm—Ohlandt, Greeley, Ruggiero & Perle, L.L.P.

(57) ABSTRACT

A satellite communication system (10) includes at least one satellite communication signal repeater (12); at least one ground station (18) for transmitting a feeder link comprised of a plurality of communication signals to the at least one satellite communication signal repeater; and a plurality of user terminals (13) each receiving one of the communication signals over a user link from the at least one satellite communication signal repeater. A method includes steps of measuring a quality of at least one reference signal received by the user terminal, via the satellite; transmitting the measured quality of the reference signal received by the user terminal to the ground station; comparing the measured quality with a predetermined reference; and adjusting a transmit power of the ground station in response to a difference between the predetermined reference and measured quality. The transmit power of the ground station is adjusted so that a flux density of a downlink beam is substantially constant at the user terminal independent of the location of the user terminal in the beam.

9 Claims, 12 Drawing Sheets

U.S. PATENT DOCUMENTS

| | | | |
|---|---|---|---|
| 4,731,866 | | 3/1988 | Muratani et al. .......................... 455/9 |
| 4,752,925 | | 6/1988 | Thompson et al. ................... 370/104 |
| 4,752,967 | | 6/1988 | Bustamante et al. ................... 455/12 |
| 4,901,307 | | 2/1990 | Gilhousen et al. ..................... 370/18 |
| 4,941,199 | | 7/1990 | Saam ...................................... 455/10 |
| 5,010,317 | | 4/1991 | Schwendeman et al. ........ 340/311.1 |
| 5,073,900 | | 12/1991 | Mallinckrodt ............................ 375/1 |
| 5,081,703 | | 1/1992 | Lee ........................................ 455/13 |
| 5,109,390 | | 4/1992 | Gilhousen et al. ....................... 375/1 |
| 5,119,225 | | 6/1992 | Grant et al. .......................... 359/172 |
| 5,126,748 | | 6/1992 | Ames et al. .......................... 342/353 |
| 5,138,631 | | 8/1992 | Taylor ...................................... 375/1 |
| 5,216,427 | | 6/1993 | Yan et al. ............................. 342/352 |
| 5,233,626 | | 8/1993 | Ames ....................................... 375/1 |
| 5,239,671 | | 8/1993 | Linquist et al. ..................... 455/13.1 |
| 5,265,119 | | 11/1993 | Gilhousen et al. ....................... 375/1 |
| 5,303,286 | | 4/1994 | Wiedeman ............................. 379/59 |
| 5,339,330 | | 8/1994 | Mallinckrodt ............................ 375/1 |
| 5,392,450 | * | 2/1995 | Nossen ................................ 455/12.1 |
| 5,410,728 | | 4/1995 | Bertiger et al. ..................... 455/13.1 |
| 5,415,368 | | 5/1995 | Horstein et al. ................. 244/158 R |
| 5,422,647 | | 6/1995 | Hirshfield et al. ................... 342/354 |
| 5,433,726 | | 7/1995 | Horstein et al. ................. 244/158 R |
| 5,439,190 | | 8/1995 | Horstein et al. ..................... 244/158 |
| 5,446,756 | | 8/1995 | Mallinckrodt ........................ 375/200 |
| 5,539,730 | * | 7/1996 | Dent ....................................... 370/29 |
| 5,815,796 | * | 9/1998 | Armstrong et al. .................... 455/10 |

OTHER PUBLICATIONS

Before the FCC, Washington, D.C. 20554, Aries Constellation Low Earth Orbit Satellite System Proposal of Constellation Communications, Inc. Jun. 3, 1991, Appendix A, B, and C.

Application of TRW Inc. for Authority to Construct a New Communications Satellite System Odyssey before the FCC, Washington, D.C. 20554, May 31, 1991 pp. 33–51.

Application of Ellipsat Corporation ELLIPSAT for the Authority to Construct ELLIPSO I An Elliptical Orbit Satellite System, before the FCC, Washington, D.C. 20554, Nov. 2, 1990, pp. 5–34.

Application of Loral Cellular Systems, Corp., Globalstar Mobile COmmunications Wherever You Are, before the FCC, Washington, D.C. Jun. 3, 1991, pp. 94–187.

"An Integrated Satellite–Cellular Land Mobile System for Europe", E. Del Re, University of Florence, Dept. of Electronics Engineering, italy, Sep. 21, 1989.

"Current and Future Mobile Satellite Communication Systems", S. Kato et al., IEICE Transactions, vol. E 74, No. 8, Aug. 1991, pp. 2201–2210.

"Digital Network Oriented Mobile Radio Satellite System as an Integrated Part of The GSM Cellular Radio System in Europe", P. Dondl, Deutsch BUndespost/Fernmeldetechniches Zentralmt/Darmstadt, Fed. Rep. Germ, Sep. 21, 1989.

"The OmniTracs Mobile Satellite Communications and Positioning System", E. Tiedemann, Jr. et al., Vehicle Electronics in the 90's: Proceedings of the In'l Congress on Transporation Electronics, Oct. 1990.

"Software Implementation of a PN Spread Spectrum Receiver to Accommodate Dynamics", C. Cann et al., IEEE Trans. on Comm., vol. COM–25, No. 8, Aug. 1977.

"A Communication Technique for Multipath Channels", R. Price, Proceedings of the IR, Mar. 1958, pp. 555–570.

"Increased Capacity Using CDMA for Mobile Satellite Communication", K. Gilhousen et al., IEEE Journal on Selected Areas in Communications, vol. 8, No. 4, May 1990, pp. 503–514.

"The Iridium " System—A Revolutionary Satellite Communications System Developed with Innovative Applications of Technology, D. Sterling et al., IEEE, MILCOM 1991, Nov. 4–7.

"Iridium: Key to Worldwide Cellular Communications", J. Foley, Telecommuncations, Oct. 1991, pp. 23–28.

* cited by examiner

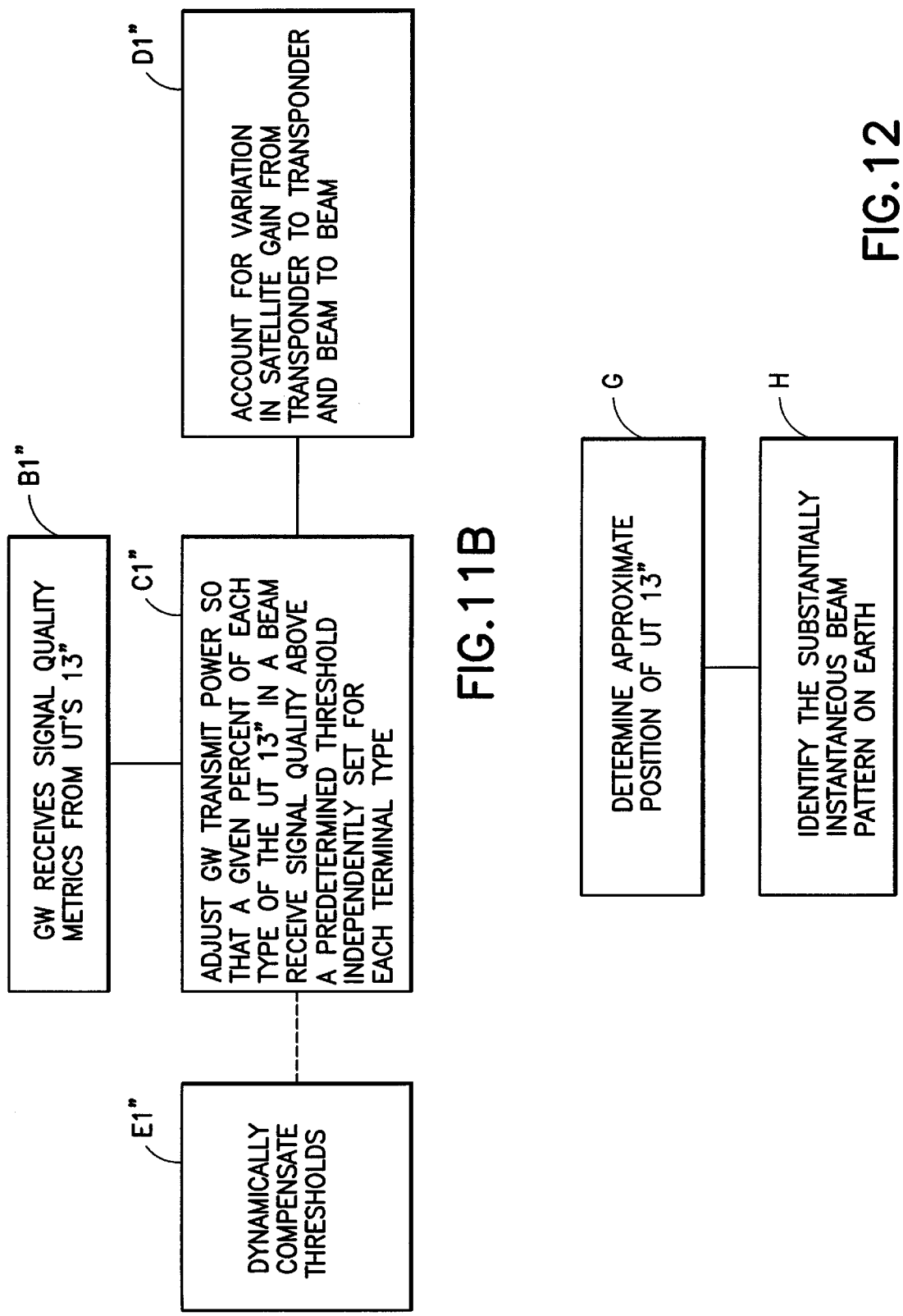

CLOSED LOOP POWER CONTROL FOR LOW EARTH ORBIT SATELLITE COMMUNICATIONS SYSTEM

CROSS-REFERENCE TO A RELATED PATENT APPLICATION

This patent application is a continuation-in-part of allowed U.S. patent application Ser. No. 08/832,644, filed Apr. 4, 1997, now U.S. Pat. No. 6,097,752, which is continuation of U.S. patent application Ser. No. 08/467,209, filed Jun. 6, 1995, now U.S. Pat. No. 5,619,525, issued Apr. 8, 1997.

FIELD OF THE INVENTION

This invention relates in general to repeater-based communication systems and, in particular, to satellite-based communications systems having bidirectional communication signal links between one or more satellites and at least one ground station.

BACKGROUND OF THE INVENTION

Satellite-based communications systems are well represented in the prior art. By example, reference is made to U.S. Pat. No. 5,303,286, which issued on Apr. 12, 1994 to one of the inventors of this patent application, and which is entitled "Wireless Telephone/Satellite Roaming System". Reference is also made to the numerous U.S. patents, foreign patents, and other publications that are of record in U.S. Pat. No. 5,303,286.

Low earth orbit satellite systems have been proposed for worldwide for mobile, cellular-like communications. These systems provide an ability to use low cost, hand-held communication devices, or user terminals, for communicating via satellite to parties in remote, rural, suburban and other environments.

As one example, user links to and from one or more satellites may operate on a relatively low frequency, such as a UHF signal. The user links are connected by the one or more satellites to ground station-originated feeder links that operate at a higher frequency, e.g., 3 GHz to 40 GHz or more. The feeder links are connected to a terrestrial gateway which allows the user to gain access to the public switched telephone network (PSTN), a private network, or some other terrestrial communications facility.

In general, if the feeder link frequency is below 7 GHz there is small potential for signal impairment. However, for frequencies above 7 GHz the effect of rain on the links to and from a satellite becomes increasingly significant. Research by NASA and others have quantified this rain effect, and have found the impairment effect to be more severe in what are termed 'rain cells' that are distributed around the site of a satellite uplink transmitter operating above 7 GHz.

A further consideration in a wireless communication system is the control of transmission power. By example, individual user links may be power controlled by a central site, such as a base station, after link impairment information between the user terminal and the base station is exchanged. This technique is generally referred to as user terminal power control. A function of this power control is to mitigate fading caused by trees, buildings and other RF-impairing factors within the user link. These impairments have the characteristic of reducing the signal power level to a lower level. To compensate for the reduction in signal level, the user terminal can be commanded to increase its transmitted power. Correspondingly, the user terminal may be able to request that the central station transmit at a higher power level.

However, and in a satellite-based communication system that uses satellites as repeaters, an increase in transmitted power from the user terminal or from a ground station, such as a gateway, can result in increased power being required for the satellite repeater. In that satellite power is a primary resource to be provided to and partitioned between many users, any increase in the power consumption of the satellite is undesirable. Furthermore, and for battery-powered user terminals, an increase in transmission power can have a detrimental impact on the number and duration of calls that can be made before the battery is required to be recharged.

This problem is compounded if the feeder link itself becomes impaired, in that the effect will be a reduction in signal power in all associated user links. To compensate for the reduction in signal power, all user terminals may request the ground station to increase its output power, thereby significantly increasing the satellite power consumption.

It is therefore desirable to provide a power control function for a satellite-based communications system that overcomes these and other problems.

SUMMARY OF THE INVENTION

This invention is directed to a satellite communication system, and a method executed by same, for providing adaptive closed loop power control. In accordance with a method of this invention for operating a satellite communication system having at least one satellite and at least one ground station, the method comprises the steps of: measuring a quality of at least one reference signal received by a user terminal, transmitting the measured quality of the reference signal received by the user terminal to the ground station, comparing the measured quality, and adjusting a transmit power of the ground station on the basis of the comparison. The reference signal being transmitted by the ground station through the satellite to the user terminal. The measured quality is compared with a predetermined reference. The transmit power of the ground station is adjusted in response to a difference between the predetermined reference and the measured quality so that a flux density of a downlink beam is substantially constant at the user terminal independent of the location of the user terminal in the beam.

Further in accordance with this invention there is provided a satellite communication system that includes at least one satellite and at least one ground station. In accordance with this invention the satellite communication system further includes means for transmitting an uplink reference signal, the satellite comprising a receiver and a transmitter, at least one user terminal and a processor coupled to the ground station. The satellite receiver receives the uplink reference signal. The satellite transmitter transmits the reference signal as a repeated downlink reference signal. The user terminal has a receiver for receiving the reference signal repeated by the satellite. The user terminal further has means for measuring a quality of the reference signal received by the user terminal, and also has means for transmitting the measured quality. The processor is coupled to the ground station for adjusting a transmit power of the ground station based on the measured quality transmitted by the user terminal. The processor is programmed to at least one of adjust the transmit power such that a flux density of a downlink beam from the satellite is substantially constant at the user terminal independent of the location of the user terminal in the beam or adjust the transmit power to compensate for predicted variation in satellite gain and maintain the flux density of the beam above a predetermined threshold at the location of the user terminal.

In another embodiment of the invention, the plurality of user terminals include a plurality of types of user terminals, and the method for operating the satellite communication system in accordance with the teachings found herein includes steps of measuring a quality of reference signals received by the user terminals, transmitting the measured quality of the reference signals received by the user terminals to the ground station, comparing the measured quality with a predetermined reference, and adjusting the transmit power of the ground station based on the comparison. The reference signals are transmitted by the ground station through the satellite to the user terminals. The transmit power of the ground station is preferably adjusted to at least one of provide a predetermined percentage of all user terminals in a given one of the downlink beams with downlink signal quality above a common predetermined threshold, or to provide a predetermined percentage of each type of user terminal in the beam with downlink signal quality above a corresponding predetermined threshold that is set independently for each type of user terminal.

BRIEF DESCRIPTION OF THE DRAWINGS

The above set forth and other features of the invention are made more apparent in the ensuing Detailed Description of the Invention when read in conjunction with the attached Drawings, wherein:

FIG. 12 is a logic flow chart that further illustrates a step of the methods illustrated in FIGS. 11A and 11B.

DETAILED DESCRIPTION OF THE INVENTION

Figure 1:
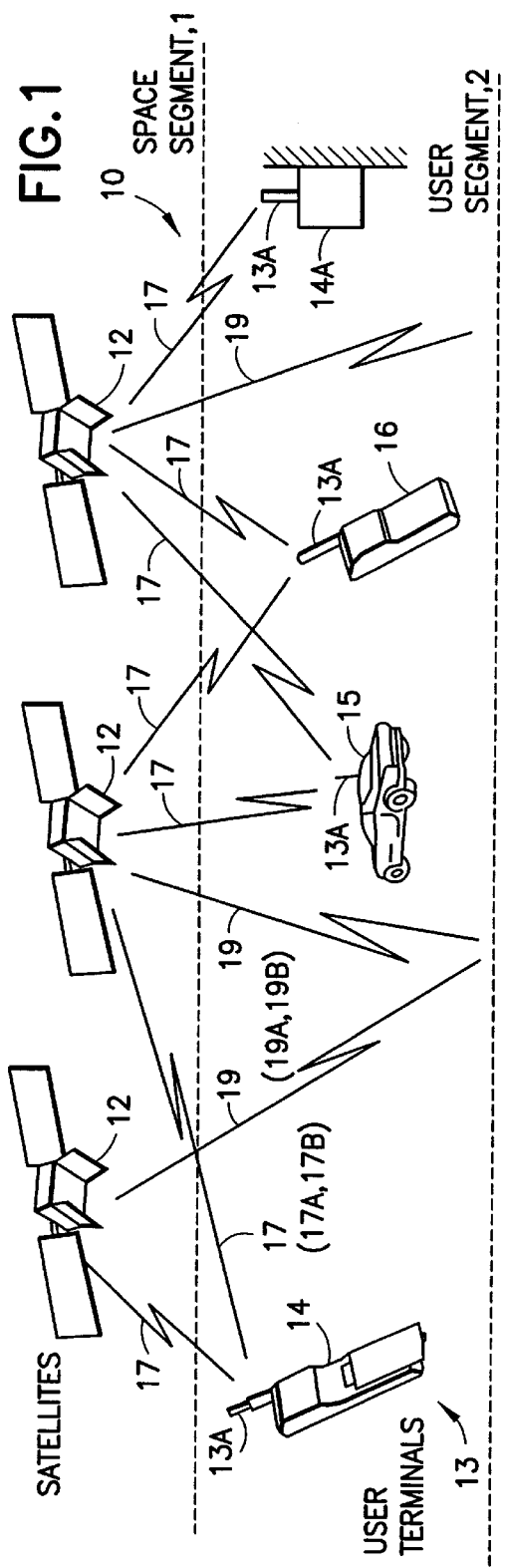
FIG. 1 is block diagram of a satellite communication system that is constructed and operated in accordance with a presently preferred embodiment of this invention.
Figure 1:
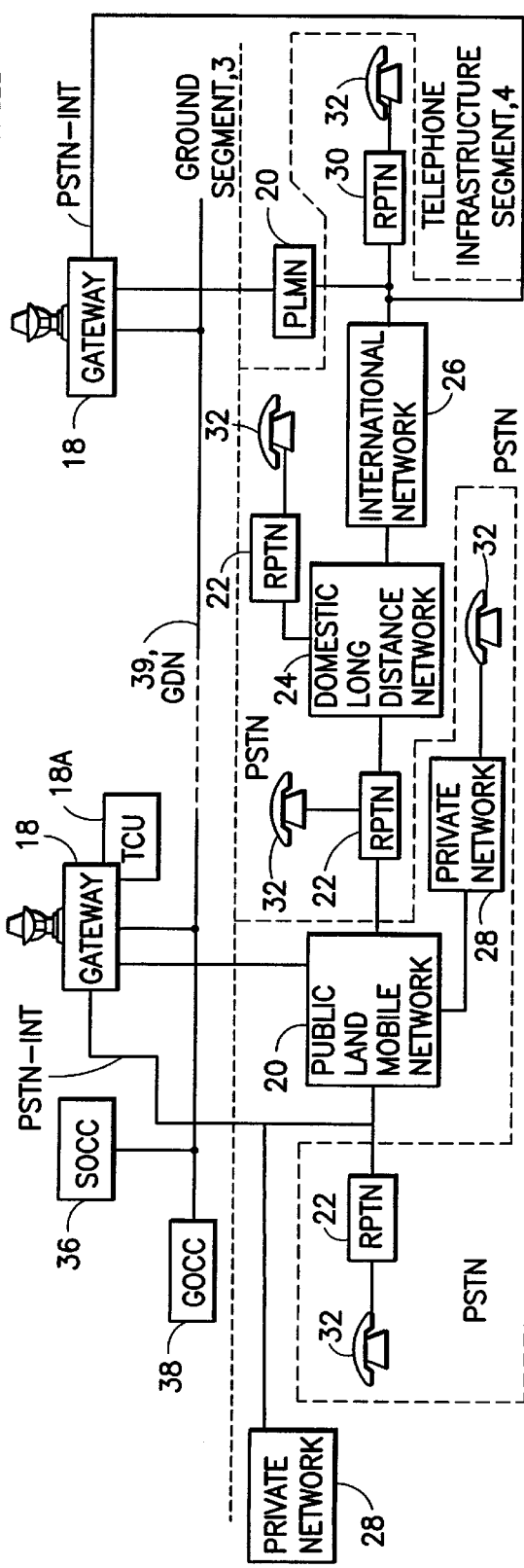

FIG. 1 illustrates a presently preferred embodiment of a satellite communication system 10 that is suitable for use with the presently preferred embodiment of the adaptive power control function of this invention. Before describing this invention in detail, a description will first be made of the communication system 10 so that a more complete understanding may be had of the power control function.

The communications system 10 may be conceptually sub-divided into a plurality of segments 1, 2, 3 and 4. Segment 1 is referred to herein as a space segment, segment 2 as a user segment, segment 3 as a ground (terrestrial) segment, and segment 4 as a telephone system infrastructure segment.

In the presently preferred embodiment of this invention there are a total of 48 satellites in, by example, a 1414 km Low Earth Orbit (LEO). The satellites 12 are distributed in eight orbital planes with six equally-spaced satellites per plane (Walker constellation). The orbital planes are inclined at 52 degrees with respect to the equator and each satellite completes an orbit once every 114 minutes. This approach provides approximately full-earth coverage with, preferably, at least two satellites in view at any given time from a particular user location between about 70 degree south latitude and about 70 degree north latitude. As such, a user is enabled to communicate to or from nearly any point on the earth's surface within a gateway (GW) 18 coverage area to or from other points on the earth's surface (by way of the PSTN), via one or more gateways 18 and one or more of the satellites 12, possibly also using a portion of the telephone infrastructure segment 4.

It is noted at this point that the foregoing and ensuing description of the system 10 represents but one suitable embodiment of a communication system within which the teaching of this invention may find use. That is, the specific details of the communication system are not to be read or construed in a limiting sense upon the practice of this invention.

Continuing now with a description of the system 10, a soft transfer (handoff) process between satellites 12, and also between individual ones of 16 spot beams transmitted by each satellite (FIG. 3B), provides unbroken communications via a spread spectrum (SS), code division multiple access (CDMA) technique. The presently preferred SS-CDMA technique is similar to the TIA/EIA Interim Standard, "Mobile Station-Base Station Compatibility Standard for Dual-Mode Wideband Spread Spectrum Cellular System" TIA/EIA/IS-95, July 1993, although other spread spectrum and CDMA techniques and protocols can be employed.

The low earth orbits permit low-powered fixed or mobile user terminals 13 to communicate via the satellites 12, each of which functions, in a presently preferred embodiment of this invention, solely as a "bent pipe" repeater to receive a communications traffic signal (such as speech and/or data) from a user terminal 13 or from a gateway 18, convert the received communications traffic signal to another frequency band, and to then re-transmit the converted signal. That is, no on-board signal processing of a received communications traffic signal occurs, and the satellite 12 does not become aware of any intelligence that a received or transmitted communications traffic signal may be conveying.

Furthermore, there need be no direct communication link or links between the satellites 12. That is, each of the satellites 12 receives a signal only from a transmitter located in the user segment 2 or from a transmitter located in the ground segment 3, and transmits a signal only to a receiver located in the user segment 2 or to a receiver located in the ground segment 3.

The user segment 2 may include a plurality of types of user terminals 13 that are adapted for communication with the satellites 12. The user terminals 13 include, by example, a plurality of different types of fixed and mobile user terminals including, but not limited to, handheld mobile radio-telephones 14, vehicle mounted mobile radio-telephones 15, paging/messaging-type devices 16, and fixed radio-telephones 14a. The user terminals 13 are preferably provided with omnidirectional antennas 13a for bidirectional communication via one or more of the satellites 12.

It is noted that the fixed radio-telephones 14a may employ a directional antenna. This is advantageous in that it enables a reduction in interference with a consequent increase in the number of users that can be simultaneously serviced with one or more of the satellites 12.

It is further noted that the user terminals 13 may be dual use devices that include circuitry for also communicating in a conventional manner with a terrestrial cellular system.

Figure 3A:
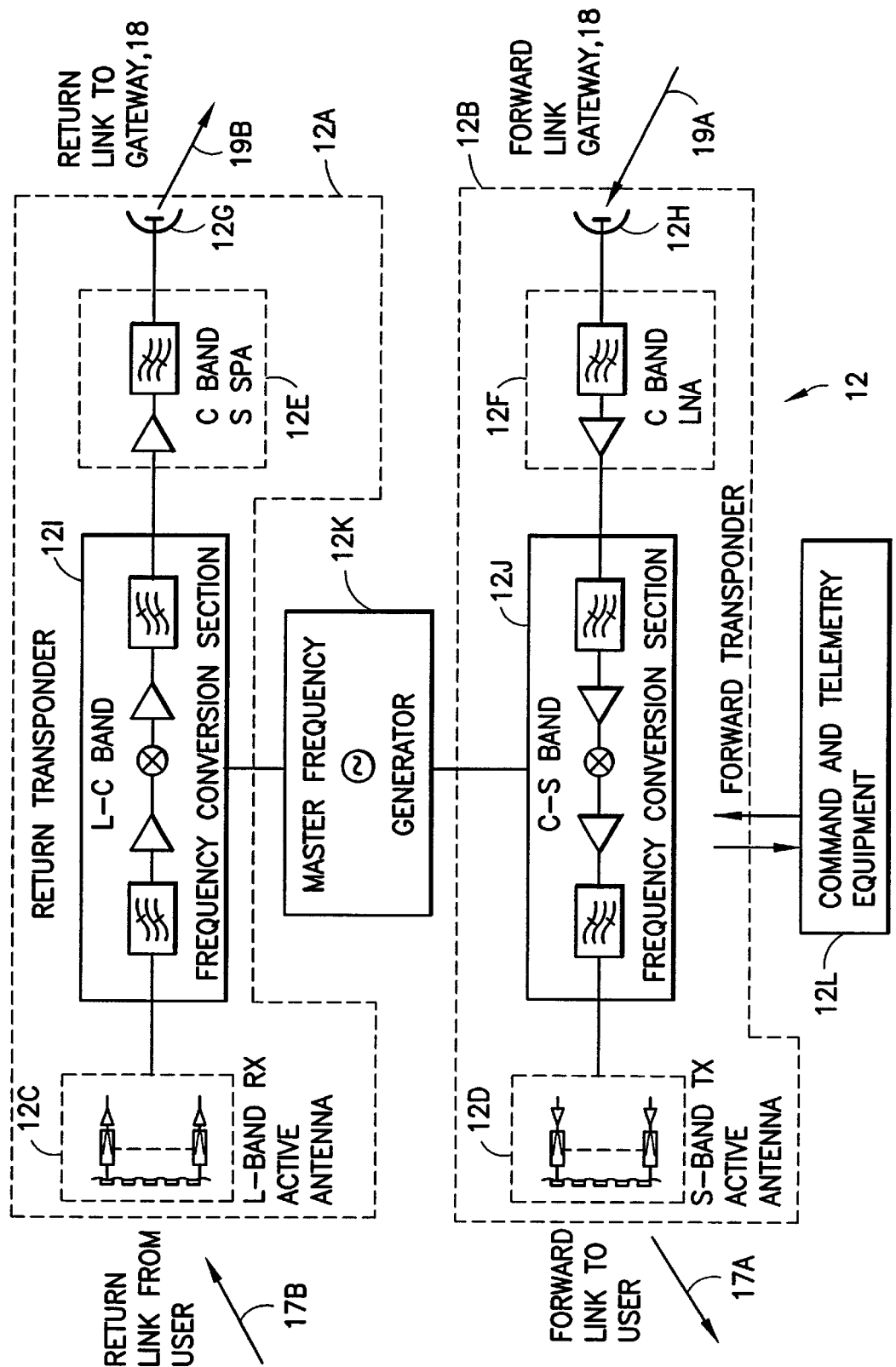
FIG. 3A is a block diagram of the communications payload of one of the satellites of FIG. 1.

Referring also to FIG. 3A, the user terminals 13 may be capable of operating in a full duplex mode and communicate via, by example, L-band RF links (uplink or return link 17b) and S-band RF links (downlink or forward link 17a) through return and forward satellite transponders 12a and 12b, respectively. The return L band RF links 17b may operate within a frequency range of 1.61 GHz to 1.625 GHz, a bandwidth of 16.5 MHz, and are modulated with packetized digital voice signals and/or data signals in accordance with the preferred spread spectrum technique. The forward S band RF links 17a may operate within a frequency range of 2.485 GHz to 2.5 GHz, a bandwidth of 16.5 MHz. The forward RF links 17a are also modulated at a gateway 18 with packetized digital voice signals and/or data signals in accordance with the spread spectrum technique.

The 16.5 MHz bandwidth of the forward link is partitioned into 13 channels with up to, by example, 128 users being assigned per channel. The return link may have various bandwidths, and a given user terminal 13 may or may not be assigned a different channel than the channel assigned on the forward link. However, when operating in the diversity reception mode on the return link (receiving from two or more satellites 12), the user is assigned the same forward and return link RF channel for each of the satellites.

The ground segment 3 includes at least one but generally a plurality of the gateways 18 that communicate with the satellites 12 via, by example, a full duplex C band RF link 19 (forward link 19a (to the satellite), return link 19b (from the satellite)) that operates within a range of frequencies generally above 3 GHz and preferably in the C-band. The C-band RF links bi-directionally convey the communication feeder links, and also convey satellite commands to the satellites and telemetry information from the satellites. The forward feeder link 19a may operate in the band of 5 GHz to 5.25 GHz, while the return feeder link 19b may operate in the band of 6.875 GHz to 7.075 GHz.

The satellite feeder link antennas 12g and 12h are preferably wide coverage antennas that subtend a maximum earth coverage area as seen from the LEO satellite 12. In the presently preferred embodiment of the communication system 10 the angle subtended from a given LEO satellite 12 (assuming 10° elevation angles from the earth's surface) is approximately 110°. This yields a coverage zone that is approximately 3600 miles in diameter.

Figure 3B:
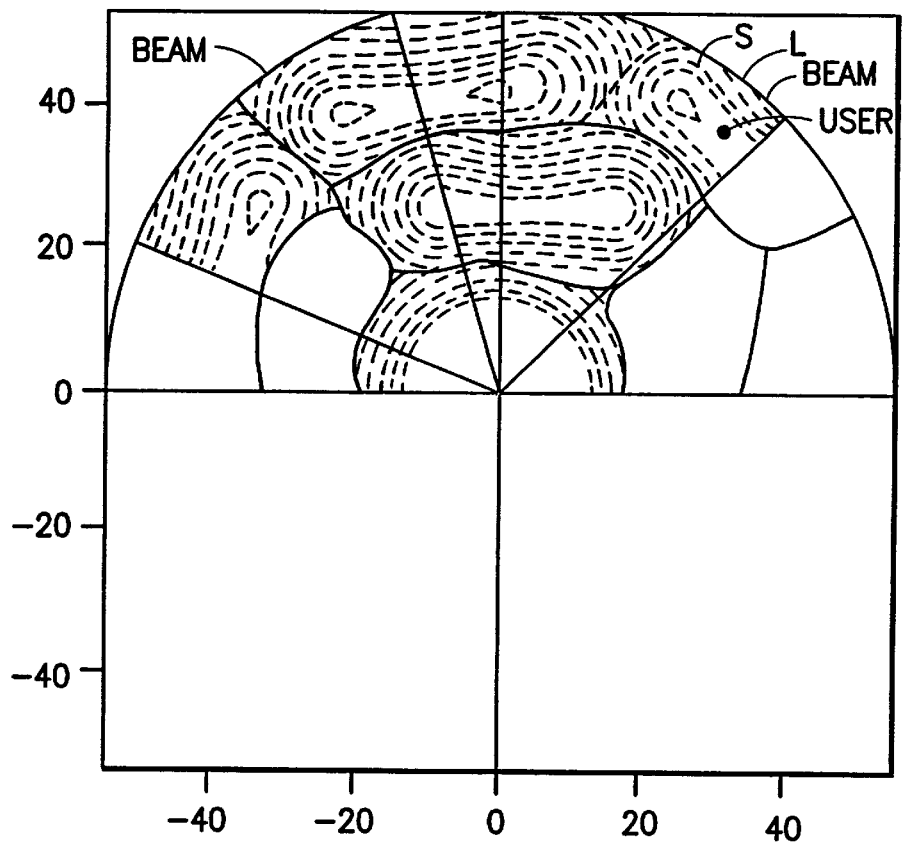
FIG. 3B illustrates a portion of the beam pattern that is transmitted from one of the satellites of FIG. 1.

The L-band and the S-band antennas are multiple beam antennas that provide coverage within an associated terrestrial service region. The L-band and S-band antennas 12d and 12c, respectively, are preferably congruent with one another, as depicted in FIG. 3B. That is, the transmit and receive beams from the spacecraft cover the same area on the earth's surface, although this feature is not critical to the operation of the system 10.

As an example, several thousand full duplex communications may occur through a given one of the satellites 12. In accordance with a feature of the system 10, two or more satellites 12 may each convey the same communication between a given user terminal 13 and one of the gateways 18. This mode of operation, as described in detail below, thus provides for diversity combining at the respective receivers, leading to an increased resistance to fading and facilitating the implementation of a soft handoff procedure.

It is pointed out that all of the frequencies, bandwidths and the like that are described herein are representative of but one particular system. Other frequencies and bands of frequencies may be used with no change in the principles being discussed. As but one example, the feeder links between the gateways and the satellites may use frequencies in a band other than the C-band (approximately 3 GHz to approximately 7 GHz), for example the Ku band (approximately 10 GHz to approximately 15 GHz) or the Ka band (above approximately 15 GHz). When using one of these latter two frequency bands the teaching of this invention becomes especially useful.

The gateways 18 function to couple the communications payload or transponders 12a and 12b (FIG. 3A) of the satellites 12 to the telephone infrastructure segment 4. The transponders 12a and 12b include an L-band receive antenna 12c, S-band transmit antenna 12d, C-band power amplifier 12e, C-band low noise amplifier 12f, C-band antennas 12g and 12h, L band to C band frequency conversion section 12i, and C band to S band frequency conversion section 12j. The satellite 12 also includes a master frequency generator 12k and command and telemetry equipment 12l.

Reference in this regard may also be had to U.S. Pat. No. 5,422,647, by E. Hirshfield et al., entitled "Mobile Communications Satellite Payload", as well as to U.S. Pat. No. 5,787,336, by E. Hirshfield et al., entitled "Satellite Communication Power Management System", the disclosures of which are incorporated by reference herein in their entireties.

The telephone infrastructure segment 4 is comprised of existing telephone systems and includes Public Land Mobile Network (PLMN) gateways 20, local telephone exchanges such as regional public telephone networks (RPTN) 22 or other local telephone service providers, domestic long distance networks 24, international networks 26, private networks 28 and other RPTNs 30. The communication system 10 operates to provide bidirectional voice and/or data communication between the user segment 2 and Public Switched Telephone Network (PSTN) telephones 32 and non-PSTN telephones 32 of the telephone infrastructure segment 4, or other user terminals of various types, which may be private networks.

Also shown in FIG. 1 (and also in FIG. 4), as a portion of the ground segment 3, is a Satellite Operations Control Center (SOCC) 36, and a Ground Operations Control Center (GOCC) 38. A communication path, which includes a Ground Data Network (GDN) 39 (see FIG. 2), is provided for interconnecting the gateways 18 and TCUs 18a, SOCC 36 and GOCC 38 of the ground segment 3. This portion of the communications system 10 provides overall system control functions.

Figure 2:
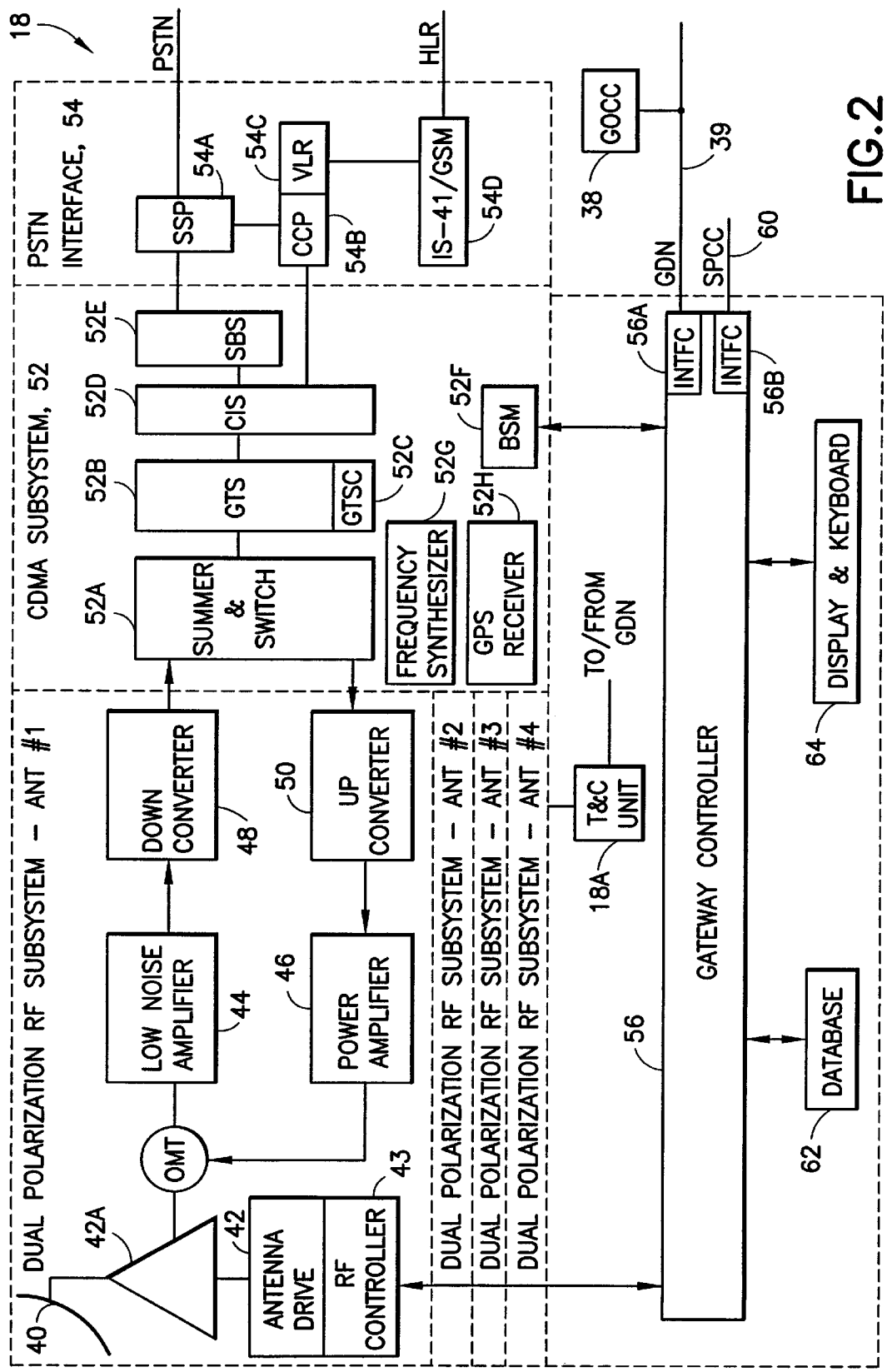
FIG. 2 is a block diagram of one of the gateways of FIG. 1.

FIG. 2 shows one of the gateways 18 in greater detail. Each gateway 18 includes up to four dual polarization RF C-band sub-systems each comprising a dish antenna 40, antenna driver 42 and pedestal 42a, low noise receivers 44, and high power amplifiers 46. All of these components may be located within a radome structure to provide environmental protection.

The gateway 18 further includes down converters 48 and up converters 50 for processing the received and transmitted RF carrier signals, respectively. The down converters 48 and the up converters 50 are connected to a CDMA sub-system 52 which, in turn, is coupled to the Public Switched Telephone Network (PSTN) though a PSTN interface 54. As an option, the PSTN could be bypassed by using satellite-to-satellite links.

The CDMA sub-system 52 includes a signal summer/switch unit 52a, a Gateway Transceiver Subsystem (GTS) 52b, a GTS Controller 52c, a CDMA Interconnect Subsystem (CIS) 52d, and a Selector Bank Subsystem (SBS) 52e. The CDMA sub-system 52 is controlled by a Base Station Manager (BSM) 52f and functions in a manner similar to a CDMA-compatible (for example, an IS-95 compatible) base station. The CDMA sub-system 52 also includes the required frequency synthesizer 52g and a Global Positioning System (GPS) receiver 52h.

The PSTN interface 54 includes a PSTN Service Switch Point (SSP) 54a, a Call Control Processor (CCP) 54b, a Visitor Location Register (VLR) 54c, and a protocol interface 54d to a Home Location Register (HLR). The HLR may be located in the cellular gateway 20 (FIG. 1) or, optionally, in the PSTN interface 54.

The gateway 18 is connected to telecommunication networks through a standard interface made through the SSP 54a. The gateway 18 provides an interface, and connects to the PSTN via Primary Rate Interface (PRI). The gateway 18 is further capable of providing a direct connection to a Mobile Switching Center (MSC).

The gateway 18 provides SS-7 ISDN fixed signalling to the CCP 54b. On the gateway-side of this interface, the CCP 54b interfaces with the CIS 52d and hence to the CDMA sub-system 52. The CCP 54b provides protocol translation functions for the system Air Interface (AI), which may be similar to the IS-95 Interim Standard for CDMA communications.

Blocks 54c and 54d generally provide an interface between the gateway 18 and an external cellular telephone network that is compatible, for example, with the IS-41 (North American Standard, AMPS) or the GSM (European Standard, MAP) cellular systems and, in particular, to the specified methods for handling roamers, that is, users who place calls outside of their home system. The gateway 18 supports user terminal authentication for system 10/AMPS phones and for system 10/GSM phones. In service areas where there is no existing telecommunications infrastructure, an HLR can be added to the gateway 18 and interfaced with the SS-7 signalling interface.

A user making a call out of the user's normal service area (a roamer) is accommodated by the system 10 if authorized. In that a roamer may be found in any environment, a user may employ the same terminal equipment to make a call from anywhere in the world, and the necessary protocol conversions are made transparently by the gateway 18. The protocol interface 54d is bypassed when not required to convert, by example, GSM to AMPS.

It is within the scope of the teaching of this invention to provide a dedicated, universal interface to the cellular gateways 20, in addition to or in place of the conventional "A" interface specified for GSM mobile switching centers and vendor-proprietary interfaces to IS-41 mobile switching centers. It is further within the scope of this invention to provide an interface directly to the PSTN, as indicated in FIG. 1 as the signal path designated PSTN-INT.

Overall gateway control is provided by the gateway controller 56 which includes an interface 56a to the above-mentioned Ground Data Network (GDN) 39 and an interface 56b to a Service Provider Control Center (SPCC) 60. The gateway controller 56 is generally interconnected to the gateway 18 through the BSM 52f and through RF controllers 43 associated with each of the antennas 40. The gateway controller 56 is further coupled to a database 62, such as a database of users, satellite ephemeris data, etc., and to an I/O unit 64 that enables service personnel to gain access to the gateway controller 56. The GDN 39 is also bidirectionally interfaced to a Telemetry and Command (T&C) unit 66 (FIGS. 1 and 4).

Figure 4:
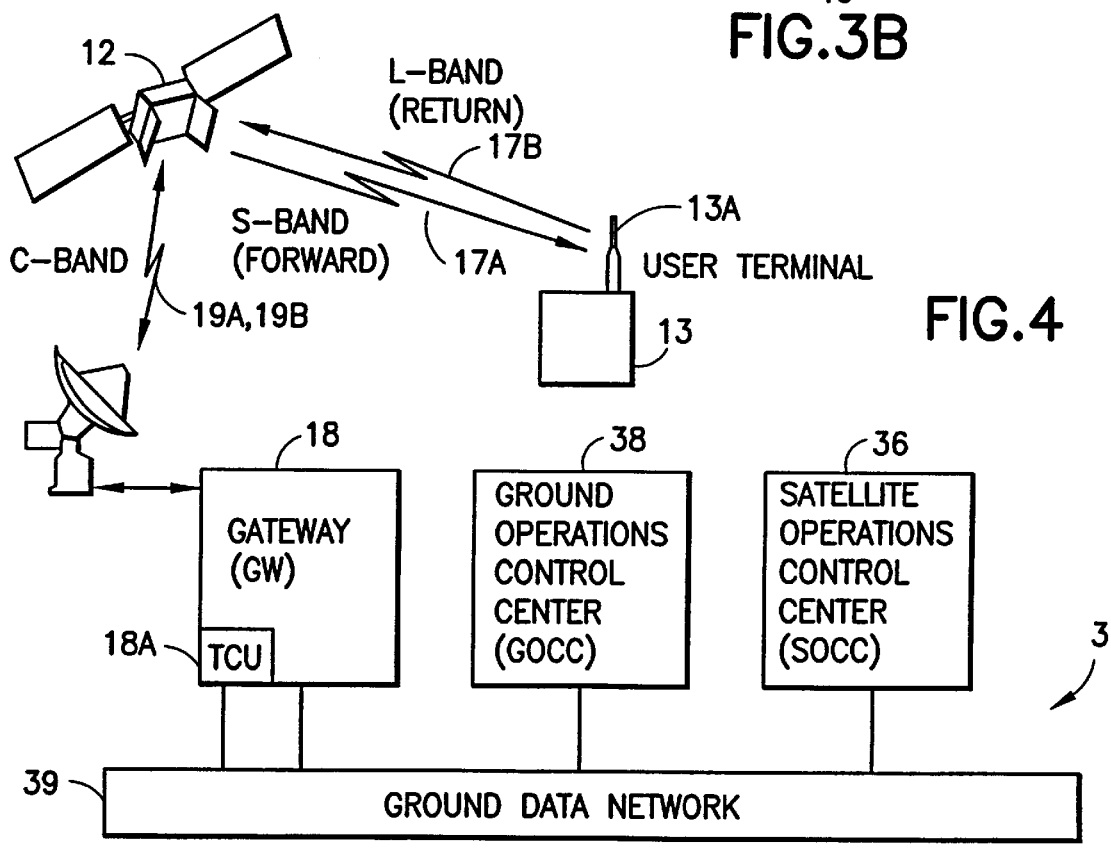
FIG. 4 is a block diagram that depicts the ground equipment support of satellite telemetry and control functions.

Referring to FIG. 4, the function of the GOCC 38 is to plan and control satellite utilization by the gateways 18, and to coordinate this utilization with the SOCC 36. In general, the GOCC 38 analyses trends, generates traffic plans, allocates satellite 12 and system resources (such as, but not limited to, power and channel allocations), monitors the performance of the overall system 10, and issues utilization instructions, via the GDN 39, to the gateways 18 in real time or in advance.

The SOCC 36 operates to maintain and monitor orbits, to relay satellite usage information to the gateway for input to the GOCC 38 via the GDN 39, to monitor the overall functioning of each satellite 12, including the state of the satellite batteries, to set the gain for the RF signal paths within the satellite 12, to ensure optimum satellite orientation with respect to the surface of the earth, in addition to other functions.

As described above, each gateway 18 functions to connect a given user to the PSTN for both signalling, voice and/or data communications and also to generate data, via database 62 (FIG. 2), for billing purposes. Selected gateways 18 include a Telemetry and Command Unit (TCU) 18a for receiving telemetry data that is transmitted by the satellites 12 over the return link 19b and for transmitting commands up to the satellites 12 via the forward link 19a. The GDN 39 operates to interconnect the gateways 18, GOCC 38 and the SOCC 36.

In general, each satellite 12 of the LEO constellation operates to relay information from the gateways 18 to the users (C band forward link 19a to S band forward link 17a), and to relay information from the users to the gateways 18 (L band return link 17b to C band return link 19b). This information includes SS-CDMA synchronization and paging channels, in addition to power control signals. Various CDMA pilot channels may also be used to monitor interference on the forward link. Satellite ephemeris update data is also communicated to each of the user terminals 13, from the gateway 18, via the satellites 12. The satellites 12 also function to relay signalling information from the user terminals 13 to the gateway 18, including access requests, power change requests, and registration requests. The satellites 12 also relay communication signals between the users and the gateways 18, and may apply security to mitigate unauthorized use.

In operation, the satellites 12 transmit spacecraft telemetry data that includes measurements of satellite operational status. The telemetry stream from the satellites, the commands from the SOCC 36, and the communications feeder links 19 all share the C band antennas 12g and 12h. For those gateways 18 that include a TCU 18a the received satellite telemetry data may be forwarded immediately to the SOCC 36, or the telemetry data may be stored and subsequently forwarded to the SOCC 36 at a later time, typically upon SOCC request. The telemetry data, whether transmitted immediately or stored and subsequently forwarded, is sent over the GDN 39 as packet messages, each packet message containing a single minor telemetry frame. Should more than one SOCC 36 be providing satellite support, the telemetry data is routed to all of the SOCCs.

The SOCC 36 has several interface functions with the GOCC 38. One interface function is orbit position information, wherein the SOCC 36 provides orbital information to the GOCC 38 such that each gateway 18 can accurately track up to four satellites that may be in view of the gateway. This data includes data tables that are sufficient to allow the gateways 18 to develop their own satellite contact lists, using known algorithms. The SOCC 36 is not required to known the gateway tracking schedules. The TCU 18a searches the downlink telemetry band and uniquely identifies the satellite being tracked by each antenna prior to the propagation of commands.

Another interface function is satellite status information that is reported from the SOCC 36 to the GOCC 38. The satellite status information includes both satellite/transponder availability, battery status and orbital information and incorporates, in general, any satellite-related limitations that would preclude the use of all or a portion of a satellite 12 for communications purposes.

An important aspect of the system 10 is the use of SS-CDMA in conjunction with diversity combining at the gateway receivers and at the user terminal receivers. Diversity combining is employed to mitigate the effects of fading as signals arrive at the user terminals 13 or the gateway 18 from multiple satellites over multiple and different path lengths. Rake receivers in the user terminals 13 and the gateways 18 are employed to receive and combine the signals from multiple sources. As an example, a user terminal 13 or the gateway 18 provides diversity combining for the forward link signals or the return link signals that are simultaneously received from and transmitted through the multiple beams of the satellites 12.

In this regard the disclosure of U.S. Pat. No. 5,233,626, issued Aug. 3, 1993 to Stephen A. Ames and entitled "Repeater Diversity Spread Spectrum Communication System", is incorporated by reference herein in its entirety.

The performance in the continuous diversity reception mode is superior to that of receiving one signal through one satellite repeater, and furthermore there is no break in communications should one link be lost due to shadowing or blockage from trees or other obstructions that have an adverse impact on the received signal.

The multiple, directional, antennas 40 of a given one of the gateways 18 are capable of transmitting the forward link signal (gateway to user terminal) through different beams of one or more satellites 12 to support diversity combining in the user terminals 13. The omnidirectional antennas 13a of the user terminals 13 transmit through all satellite beams that can be "seen" from the user terminal 13.

Each gateway 18 supports a transmitter power control function to address slow fades, and also supports block interleaving to address medium to fast fades. Power control is implemented on both the forward and reverse links. The response time of the power control function is adjusted to accommodate for a worst case 30 msec satellite round trip delay.

The block interleavers (53d, 53e, 53f, FIG. 5) operate over a block length that is related to vocoder 53g packet frames. An optimum interleaver length trades off a longer length, and hence improved error correction, at the expense of increasing the overall end-to-end delay. A preferred maximum end-to-end delay is 150 msec or less. This delay includes all delays including those due to the received signal alignment performed by the diversity combiners, vocoder 53g processing delays, block interleaver 53d–53f delays, and the delays of the Viterbi decoders (not shown) that form a portion of the CDMA sub-system 52.

Figure 5:
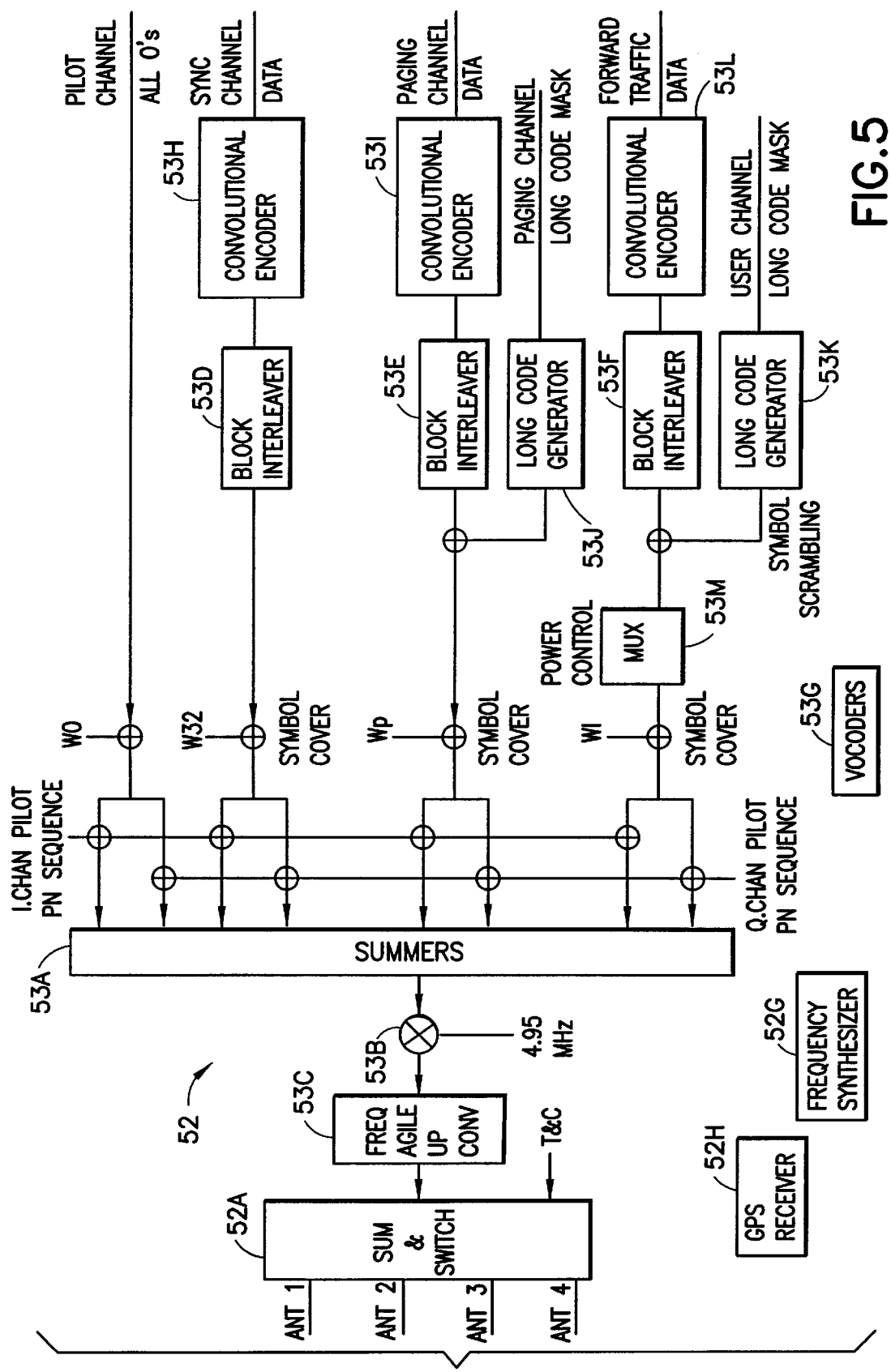
FIG. 5 is block diagram of the CDMA sub-system of FIG. 2.

FIG. 5 is a block diagram of the forward link modulation portion of the CDMA sub-system 52 of FIG. 2. An output of a summer block 53a feeds a frequency agile up-converter 53b which in turn feeds the summer and switch block 52a. The telemetry and control (T&C) information is also input to the block 52a.

An unmodulated direct sequence SS pilot channel generates an all zeros Walsh Code at a desired bit rate. This data stream is combined with a short PN code that is used to separate signals from different gateways 18 and different satellites 12. If used, the pilot channel is modulo 2 added to the short code and is then QPSK or BPSK spread across the CDMA FD RF channel bandwidth. The following different pseudonoise (PN) code offsets are provided: (a) a PN code offset to allow a user terminal 13 to uniquely identify a gateway 18; (b) a PN code offset to allow the user terminal 13 to uniquely identify a satellite 12; and (c) a PN code offset to allow the user terminal 13 to uniquely identify a given one of the 16 beams that is transmitted from the satellite 12. Pilot PN codes from different ones of the satellites 12 are assigned different time/phase offsets from the same pilot seed PN code.

If used, each pilot channel that is transmitted by the gateway 18 may be transmitted at a higher or lower power level than the other signals. A pilot channel enables a user terminal 13 to acquire the timing of the forward CDMA channel, provides a phase reference for coherent demodulation, and provides a mechanism to perform signal strength comparisons to determine when to initiate handoff. The use of the pilot channel is not, however, mandatory, and other techniques can be employed for this purpose.

The Sync channel generates a data stream that includes the following information: (a) time of day; (b) transmitting gateway identification; (c) satellite ephemeris; and (d) assigned paging channel. The Sync data is applied to a convolution encoder 53h where the data is convolutionally encoded and subsequently block interleaved to combat fast fades. The resulting data stream is modulo two added to the synchronous Walsh code and QPSK or BPSK spread across the CDMA FD RF channel bandwidth.

The Paging channel is applied to a convolutional encoder 53i where it is convolutionally encoded and is then block interleaved. The resulting data stream is combined with the output of a long code generator 53j. The long PN code is used to separate different user terminal 13 bands. The paging channel and the long code are modulo two added and provided to a symbol cover where the resulting signal is modulo two added to the Walsh Code. The result is then QPSK or BPSK spread across the CDMA FD RF channel bandwidth.

In general, the paging channel conveys several message types which include: (a) a system parameter message; (b) an access parameter message; and (c) a CDMA channel list message.

The system parameter message includes the configuration of the paging channel, registration parameters, and parameters to aid in acquisition. The access parameters message includes the configuration of the access channel and the access channel data rate. The CDMA channel list message conveys, if used, an associated pilot identification and Walsh code assignment.

The vocoder 53k encodes the voice into a PCM forward traffic data stream. The forward traffic data stream is applied to a convolutional encoder 531 where it is convolutionally encoded and then block interleaved in block 53f. The resulting data stream is combined with the output of a user long code block 53k. The user long code is employed to separate different subscriber channels. The resulting data stream is then power controlled in multiplexer (MUX) 53m, modulo two added to the Walsh code, and then QPSK or BPSK spread across the CDMA FD RF communication channel bandwidth.

The gateway 18 operates to demodulate the CDMA return link(s). There are two different codes for the return link: (a) the zero offset code; and (b) the long code. These are used by the two different types of return link CDMA Channels, namely the access channel and the return traffic channel.

For the access channel the gateway 18 receives and decodes a burst on the access channel that requests access. The access channel message is embodied in a long preamble followed by a relatively small amount of data. The preamble is the user terminal's long PN code. Each user terminal 13 has a unique long PN code generated by a unique time offset into the common PN generator polynomial.

After receiving the access request, the gateway 18 sends a message on the forward link paging channel (blocks 53e, 53i, 53j) acknowledging receipt of the access request and assigning a Walsh code to the user terminal 13 to establish a traffic channel. The gateway 18 also assigns a frequency channel to the user terminal 13. Both the user terminal 13 and the gateway 18 switch to the assigned channel element and begin duplex communications using the assigned Walsh (spreading) code(s).

The return traffic channel is generated in the user terminal 13 by convolutionally encoding the digital data from the local data source or the user terminal vocoder. The data is then block interleaved at predetermined intervals and is applied to a 128-Ary modulator and a data burst randomizer to reduce clashing. The data is then added to the zero offset PN code and transmitted through one or more of the satellites 12 to the gateway 18.

The gateway 18 processes the return link by using, by example, a Fast Hadamard Transform (FHT) to demodulate the 128-Ary Walsh Code and provide the demodulated information to the diversity combiner.

The foregoing has been a general description of a presently preferred embodiment of the communication system 10. A description is now made of embodiments of the forward link power control system.

The forward link is considered as the link from the gateway 18 to the user terminals 13 via at least one satellite 12. The feeder link 19 is considered to be that portion of the forward link which connects the satellite 12 to and from the gateway 18, while the user links 17 are considered to be that portion of the forward link from which connects the satellite 12 to and from the user terminals 13.

Figure 6:
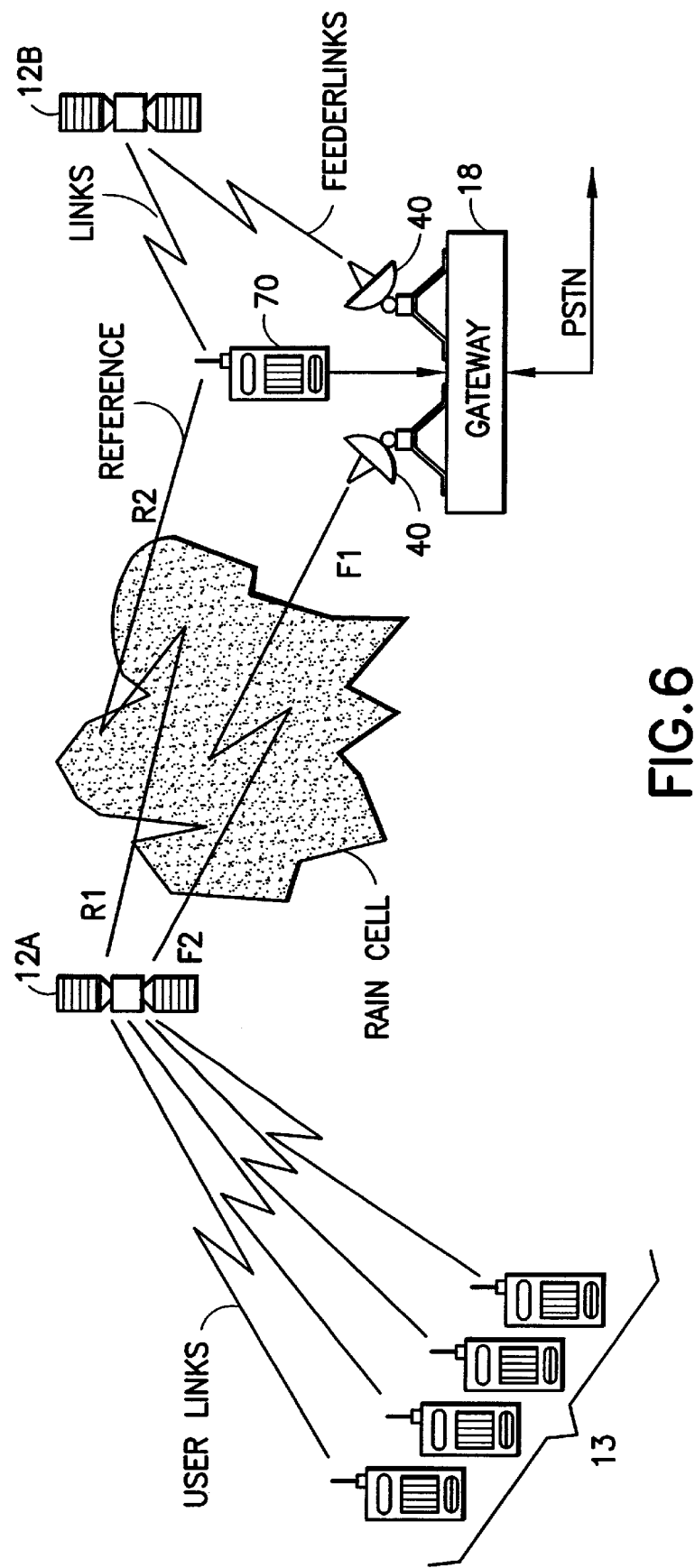
FIG. 6 is a block diagram illustrating the satellite communication system having an adaptive power control function in accordance with this invention.

Referring to FIG. 6, the feeder link to one or more satellites 12 from the gateway 18 provides the drive power for the user links. The user links consume a considerable amount of power on the satellite 12. If there is no impairment on the feeder link, as between the gateway 18 and the satellite 12', the power of the satellite is maximized to its associated user links, thereby maximizing the efficiency and capacity of the total system.

However, if the feeder link itself is impaired, as by a rain cell located between the gateway 18 and the satellite 12", the user link power control loop described previously will be activated whether or not a particular user terminal 13 finds itself impaired. That is, a user terminal 13 detecting a decrease in the signal power received from the satellite 12" will send a message over the reverse link requesting that the power of the forward link be increased. It can be appreciated that due to the attenuation in the feeder link signal due to a rain cell that all user terminals 13 receiving communication signals from the satellite 12" will simultaneously experience a decrease in received power, and will simultaneously request that the feeder link power be increased. The resulting sudden surge in feeder link power translates to a significant corresponding increase in power consumption in the satellite 12", which operates to repeat the feeder link signals to the user terminals 13 with a power that corresponds in a substantially linear fashion to the received feeder link power.

That is, low earth orbit satellite systems, and other satellite systems generally, track a satellite as it passes over the ground station, in this case the gateway 18. This results in the gateway 18 antenna 40 being steered such that it may be transmitting the feeder link signal F1 through the rain cell. As a result, the signal level of feeder link portion F2 will be reduced compared to F1. The feeder link portion F2 experiences additional path loss until it reaches the satellite 12". As a result of these losses all user terminals 13 will demand more satellite prime power.

An outer power control loop is provided in the feeder link(s) at the gateway 18. The outer power control loop operates to increase the transmitted power from the gateway 18 antenna 40 in proportion to the attenuation caused by a feeder link impairment, in this case a rain cell. This outer power control loop thus maintains the power flux density received by the satellite 12" at a nearly constant level and, as a result, the user terminals 13 do not experience a significant decrease in received power from the satellite 12".

Figure 7:
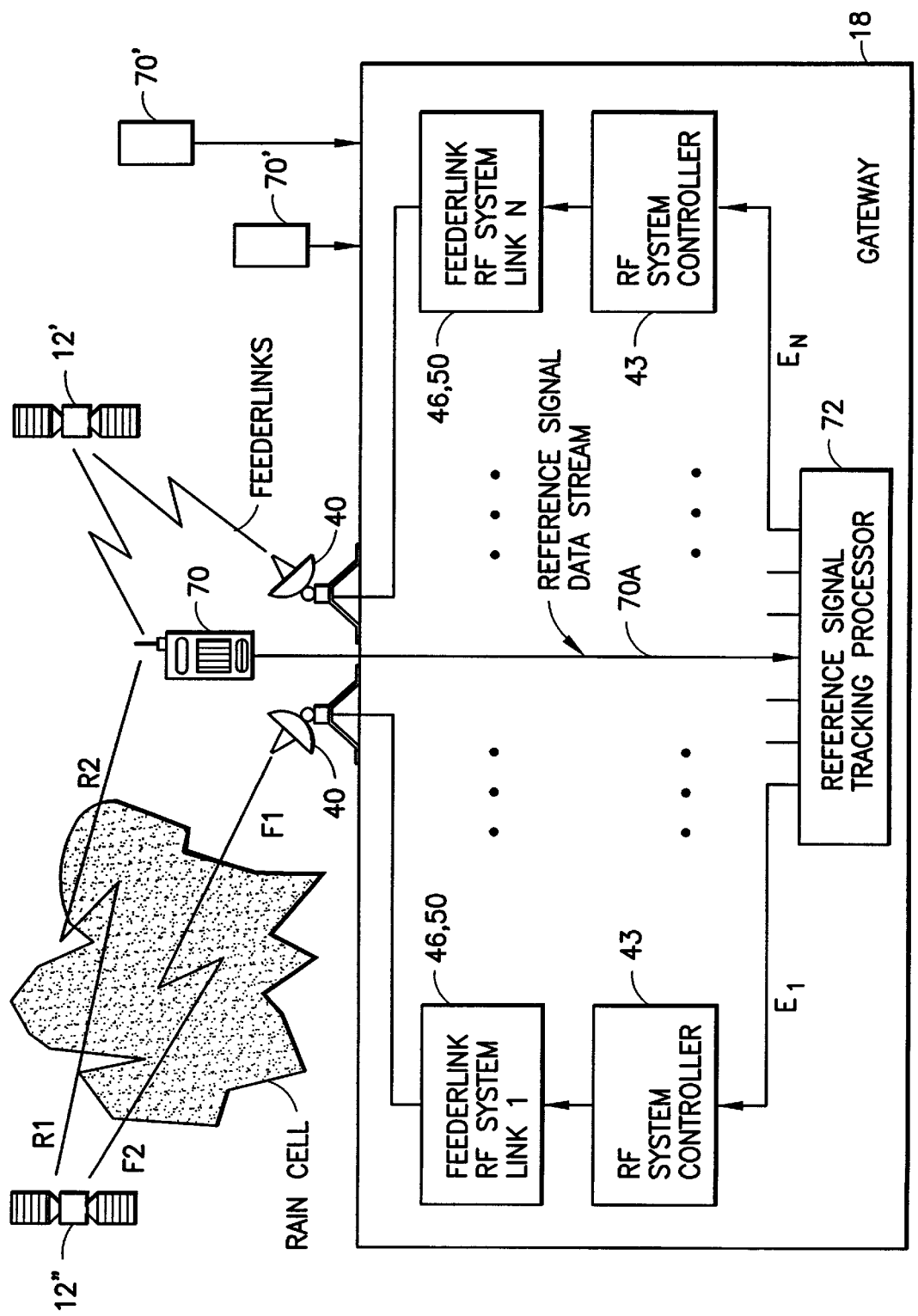
FIG. 7 is a block diagram that illustrates in greater detail the components of the adaptive power control function.

The outer power control loop includes a reference signal receiver 70 and a reference signal tracking processor 72, as shown in FIGS. 6 and 7. The reference signal receiver 70 and the reference signal tracking processor 72 operate in conjunction with the RF system controllers 43 and feeder link RF systems 46, 50 (as shown in the gateway 18 block diagram of FIG. 2). The reference signal receiver 70 monitors a downlink reference (R) signal from the satellites 12 at a specified frequency. This frequency is selected to be low enough so that it is not significantly impaired by the rain cell (for example a frequency in the S-band), and thus remains at essentially the same level at portion R2 as at portion R1. The reference signal receiver 70 demodulates the received SS-CDMA signal and outputs as a data stream 70a a reference signal received signal power indication to the reference signal tracking processor 72 in the gateway 18. The reference signal tracking processor 72 processes the data stream 70a and issues error signals or commands to the one or more RF system controllers 43, which in turn control the gain of the feeder link RF system(s) 46, 50 on link 1 to link N of the gateway 18. In this manner the transmitted feeder link power is increased in proportion to the amount of attenuation experienced by the feeder link between the gateway 18 and a satellite 12.

Figure 8:
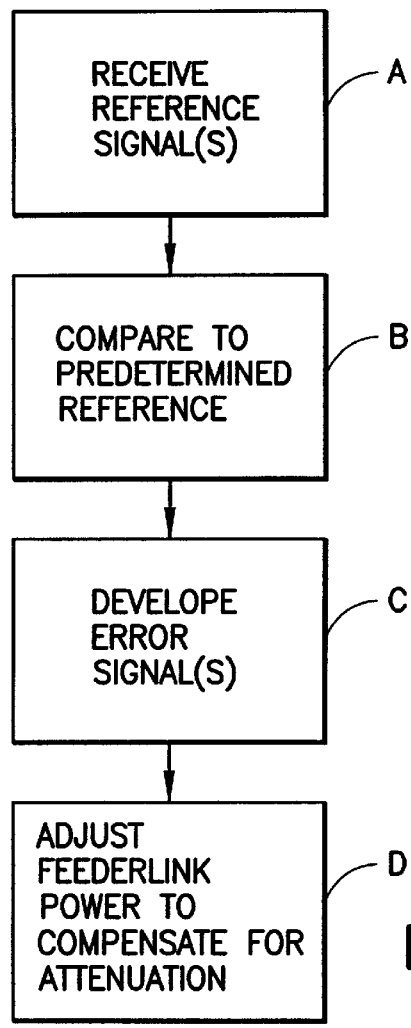
FIG. 8 is a logic flow diagram that illustrates a power control method of this invention.

In greater detail, and referring also to the logic flow diagram of FIG. 8, at Block A the feeder link spread spectrum reference signal receiver 70 receives and demodulates each of the down link reference signals R. Since the reference signal downlink frequency is significantly less than the uplink feeder link frequency, the majority of the rain loss (if any) is incurred by the uplink feeder link signal. Consequently, at Block B the received signal power indication signal is compared to a predetermined reference by the reference signal tracking processor 72, and at Block C an error signal (E) proportional to the feeder link loss caused by a channel impairment, such as rain, is derived and output to the RF system controllers 43. That is, an error signal ($E_1$ to $E_N$) is derived for each of the feeder links 1–N. The error signal in turn is used by each RF system controller 43 to control, at Block D, the power of the composite feeder link that is comprised of the reference signal R, and all of the individual user terminal 13 communication signals, to compensate for the rain loss.

That is, the reference signal R is transmitted on the uplink feeder link with a predetermined PN code and a first frequency from gateway 18, is attenuated by RF impairments, such as a rain cell, between the satellite 12" and the gateway 18, is received and repeated by the satellite 12" at a second, lower frequency on the downlink, and is received, despread, demodulated and processed by the reference signal receiver 70 and the reference signal tracking processor 72. An error signal is next developed that indicates an amount of RF impairment that is occurring on the uplink feeder link, it being remembered that the uplink frequency band causes the feeder link to be more susceptible to RF impairments, such as rain, than the downlink signal from the satellite 12". The error signal is then employed to vary the uplink feeder link transmission power so as to cause the power level of each of the signals received by each of the user terminals 13 to remain substantially the same.

It should be realized that an error signal can be provided to each of the RF system controllers 43, from which each RF system controller 43 derives a change in its associated feeder link power; or a change in feeder link power can be derived in the reference signal tracking processor 72 from the error signal, for each RF system controller 43, and transmitted as a suitable power control command to the RF system controllers.

Because of the ability of a spread spectrum receiver to separate multiple overlapping reference signals from a plurality of satellites by using a unique PN code for each reference signal, a single reference signal receiver 70 may be utilized to independently control the feeder link uplink powers to each of the satellites 12 within view of a particular gateway 18. That is, a distinct PN code is assigned to each reference signal. In this regard, the reference signal receiver 70 may employ a well-known RAKE receiver having a plurality of fingers for simultaneously despreading and tracking a plurality of the reference signals. Alternately the reference signal receiver 70 may instead employ a single finger that is time multiplexed between the reference signals repeated by a plurality of satellites 12 that are in view of the reference signal receiver 70. In either case the uplink feeder link power is increased only as necessary, allowing more efficient use of the satellite capacity and minimizing coordination difficulties with other satellites 12 in similar orbits and which share the same band of frequencies. This technique also minimizes the effect of higher feeder link power for terrestrial coordination.

For systems employing multiple downlink beams a plurality of reference signal receivers 70 (designated 70' in FIG. 7) may be placed at suitable points over the gateway coverage area, and the reference signal data stream is conveyed to the reference signal tracking processor 72 over terrestrial data lines, or as a data stream via the satellites 12. In this latter case the data stream can also be received by the reference signal receiver 70 at the gateway 18 and then input to the reference signal tracking processor 72.

As employed herein a received signal power or quality indication that is reported back to the gateway 18 in the data stream 70a may be, by example, a received signal strength indicator (RSSI) measurement, or a signal quality measurement. The signal quality indication could be based on, for example, a received bit error rate (BER) measurement, or on a frame error rate (FER) measurement derived from, by example, Viterbi decoder metrics. The quality indication could also be based in whole or in part on a subjective Mean Opinion Score wherein predetermined voice sequences are rated by a population of listeners. The signal power or quality indication is compared by the reference signal tracking processor 72 to a predetermined value, such as a reference signal strength or signal quality value, and the error signal is developed so as to represent a deviation between the two compared values. A goal of the outer power control loop is to minimize the feeder link power in a manner that is consistent with the desired link quality. Minimizing the feeder link power, while simultaneously providing satisfactory user communications, thus conserves satellite prime power.

The reference value to which the received signal power indication is compared is determined in accordance with a desired power level at which the user terminals 13 are to receive the communication signals that are repeated by the satellites 12 from the feeder link. The reference value need not be a fixed value, but can be varied depending upon, by example, total user load or demand, time of day, a total desired RF flux level at the ground within a given satellite spot beam (e.g., approximately 154 $dBW/m^2/4$ kHz, as a function of elevation angle), etc.

For the case where a plurality of reference signal receivers 70 are located within the area served by the gateway 18, the gateway 18 may process the inputs from the plurality of reference signal receivers 70 and 70' by combining them in a predetermined manner, such as by an averaging or a weighted averaging technique. For the latter case reference signal power indications received from those reference signal receivers 70' that are associated with a region having a high user density (i.e., urban areas) may be weighted more heavily than signal power indications received from regions with a lower user density.

The power control technique of this invention thus compensates for impairments in the feeder links (e.g., rain attenuation for Ka or Ku band feeder links, impairments due to a low elevation angle satellite receiving a C-band feeder link, impairments due to signals received from impaired beams, etc.), and may also compensate for a degradation in satellite operational capacity over time.

Figure 9:
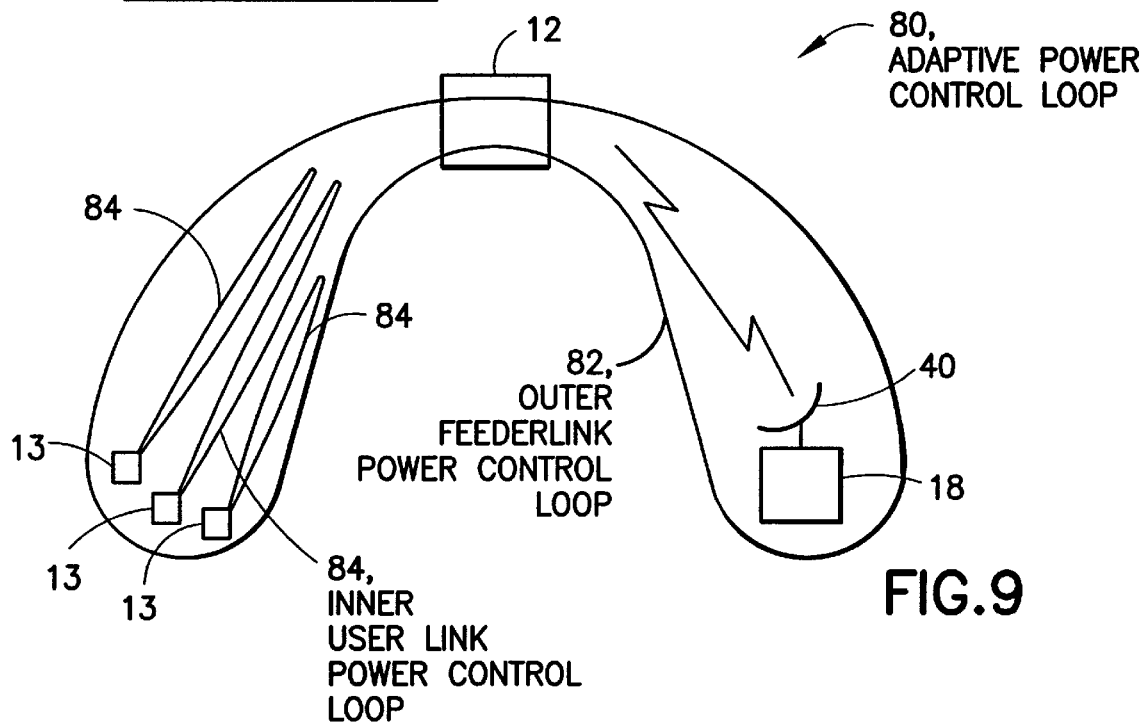
FIG. 9 depicts a two-level adaptive power control loop of this invention having an outer, global feeder link power control loop to compensate for bulk power impairments and a plurality of inner, user link power control loops to compensate for individual user link power impairments.

Referring to FIG. 9, the closed loop power control technique of this invention may be viewed as a two-level adaptive power control loop 80 with an outer, global feeder link power control loop 82 to compensate for bulk power impairments (e.g., those due to rain cells) and a plurality of inner, user link power control loops 84 to compensate for individual user link impairments (such as those resulting from foliage). A time constant of the outer feeder link power control loop 82 is preferably longer (for example, 5 to 10 times longer) than that of the inner user link power control loops 84.

As an example of the closed loop power control technique of this invention; if it is assumed that the user terminal dynamic power control range is 10 dB, and if a rain cell introduces an 8 dB loss to the S-band forward links received by the user terminals from a satellite 12, then a 6 dB impairment in a user link caused by a fade may not be correctable. If, instead, the gateway 18 compensates all user links for the 8 dB rain cell loss by increasing the feeder link power proportionately, then the dynamic range of the user terminal power control function is not adversely affected by the rain cell-induced loss.

In accordance with this invention, the outer power control loop allows the gateways 18 to maintain a near-constant, desired flux density on the surface of the earth, compensating for losses in the forward link due to such factors as for example; uplink and downlink attenuation, mispointing of the gateway antenna 40, variation of the satellite gain due to such factors as receive and transmit antenna patterns, and transponder gain uncertainty due to temperature. The outer power control loop of this invention does not require the signal transmitted by the gateway to be received by the gateway, or for a pilot signal to be transmitted from the ground, nor does it require a beacon to be transmitted from the satellite.

In accordance with this invention, a gateway 18 transmits, through one or more satellites 12, one or more signals, such as for example one or more signals on the pilot channels or the communication channels of the forward link, the signals being received by one or more user terminals 13 in one or more downlink beams covering the areas of earth viewable from the satellite(s). At least some of the user terminals 13 measure the quality of the received signals, which may be either specific reference signals or normal communications signals. The user terminals 13 may be either of a known type 13', having a calibrated performance, which are located in specific known locations, or the terminals may include a variety of user terminal types 13" with a typical factory spread of performance which are generally randomly or pseudo randomly distributed over the service area. The reference user terminals 13', 13" transmit measured signal quality data to the gateway, which adjusts the power of the reference signals based on the quality data from the terminals as well as based on other factors such as, for example, the type and location of the receiving terminal.

Figure 10:
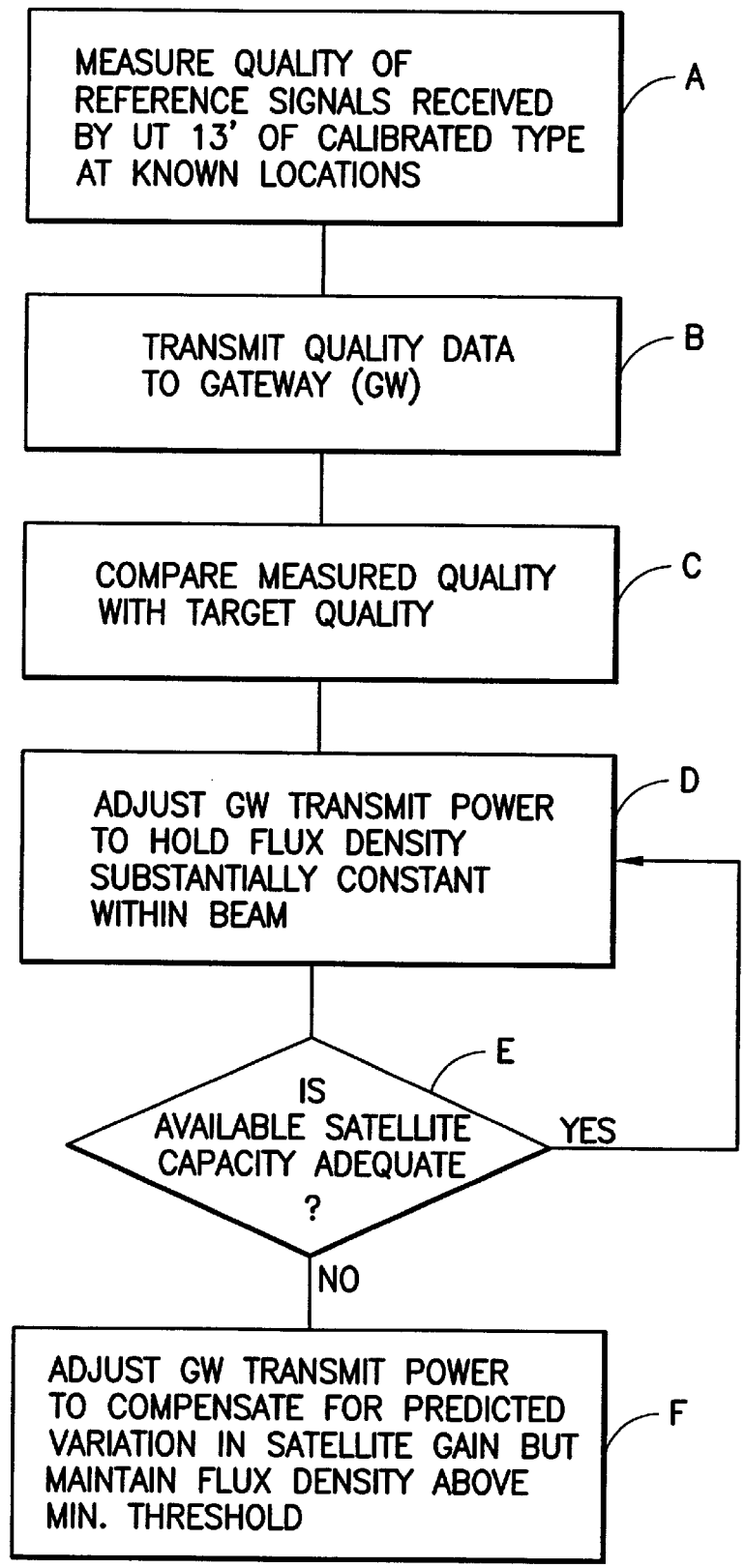
FIG. 10 shows a second logic flow chart that illustrates a second control method in accordance with this invention.

In greater detail, and referring also to the flow chart in FIG. 10, in the case where the reference user terminals 13' are of a calibrated type at known locations in the service area, the quality of the received signal is measured by each of the reference terminals 13' in Step A. The reference terminals 13' may be located in any beam, including beams not visible from the gateway. In Step B, the reference terminals 13' send the measured quality (e.g., Ec/No and/or one or more measured error rates (e.g., frame or symbol)) to the corresponding gateway 18 either by land line, or by transmitting the measured data back through the satellite 12. In Step C, the measured value received from the reference terminal 13' is compared to a predetermined reference or target value by the signal tracking processor 72 in the gateway 18. The gateway transmit power of the reference signal is adjusted in Steps D and F of FIG. 10 in response to the difference between the target and measured values. The gateway 18 adjusts the transmit power of the reference signal in Step D in order to maintain the quality of the signal received by the reference terminal 13' substantially constant, thus holding the flux density at the terminal substantially constant independent of the location of the reference terminal in the beam (assuming an omni-directional antenna at the reference terminal 13'). In Step F, the power adjustment of the transmitted signal performed by the gateway 18 may include a compensating factor which takes into account, for example, a predicted variation in the ground pattern of the forward link transmit and receive satellite antennas, and/or a variation in the transponder gain and path loss due to spatial changes between the satellite 12 and reference user terminals 13' (for example due to the satellite moving along its orbital track). The variation in the transponder gain and antenna patterns as the satellite 12 travels in orbit can be established based on prior measurements of satellite characteristics, which measurements are stored in a suitable data storage, such as the database 62 that is coupled to the gateway controller 56. The radiation pattern change and path loss may be established from the relative positions of the satellite 12, the gateway 18, and the location of the reference terminal 13'. In this case, the compensation factor used by the gateway 18 to adjust the power of the transmit signal allows the flux density at the reference terminal 13' to vary depending on the location of the reference terminal 13' in the beam, but prevents the flux density at the reference terminal 13' from falling below some minimum value so as long as the reference terminal is within a specific beam. This power adjustment, performed by the gateway 18 in Step F of FIG. 10, is generally preferred to maximize the capacity of the satellite to support communications traffic. However, if adequate satellite capacity is available, as determined in Step E, the gateway 18 adjusts the power of the feeder link in accordance with Step D of FIG. 10 to maintain the flux density of the user link substantially constant in a specific beam.

The gateway 18 uses the variation in the power of the reference signals, adjusted as described above, to adjust the power of the communication signals in the forward link. Preferably, the adjustment function is processed by the signal processor 72 in the gateway 18 (see FIG. 7) which is suitably programmed to adjust the transmit power of the gateway 18 to either maintain the downlink beam flux density at the terminal substantially constant (as per Step D of FIG. 10) or to otherwise to compensate for the predicted variation in satellite gain such that the flux density of the beam does not fall below the predetermined threshold (Step F). However, in an alternate embodiment, the processing of the adjustment function may be performed by one or more processors external to the gateway, with only the correction signals being sent to the gateway 18.

Figure 11:
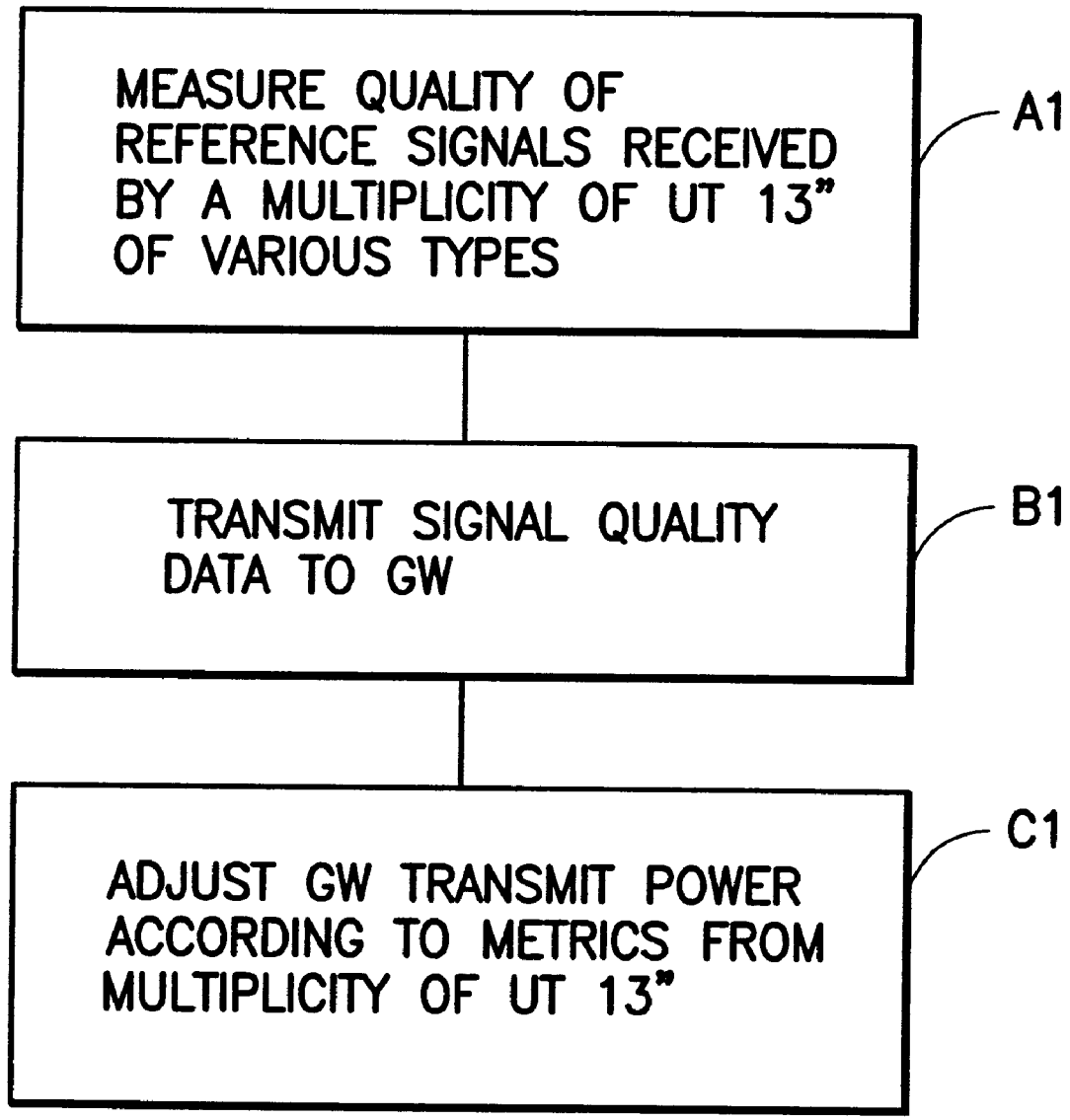
FIGS. 11–11B are logic flow charts that illustrates a third control method in accordance with this invention.

Referring now to the flow chart in FIG. 11, in the case where the user terminals 13" include a variety of types, the outer power control loop operates in a manner similar to the above-mentioned method for calibrated terminals 13', but does not require that the location of the reference terminals 13" be known. In this method, a plurality of the various types of reference terminals 13" can be somewhat randomly or pseudo randomly positioned over a service area. The reference terminals 13" receive the reference signals transmitted by the gateway 18 through one or more of the satellites 12 and measure the quality (e.g. Ec/No) of the reference signals in Step A1. In Step B1, the terminals 13" transmit the measured signal quality data back to the gateway 18 over land lines or back through one or more of the satellites 12. The gateway reference power is adjusted in Step C1 based on metrics derived from the reported signal quality, independent of the position or distribution of the reference user terminals 13" in the service area.

Figure 11A:
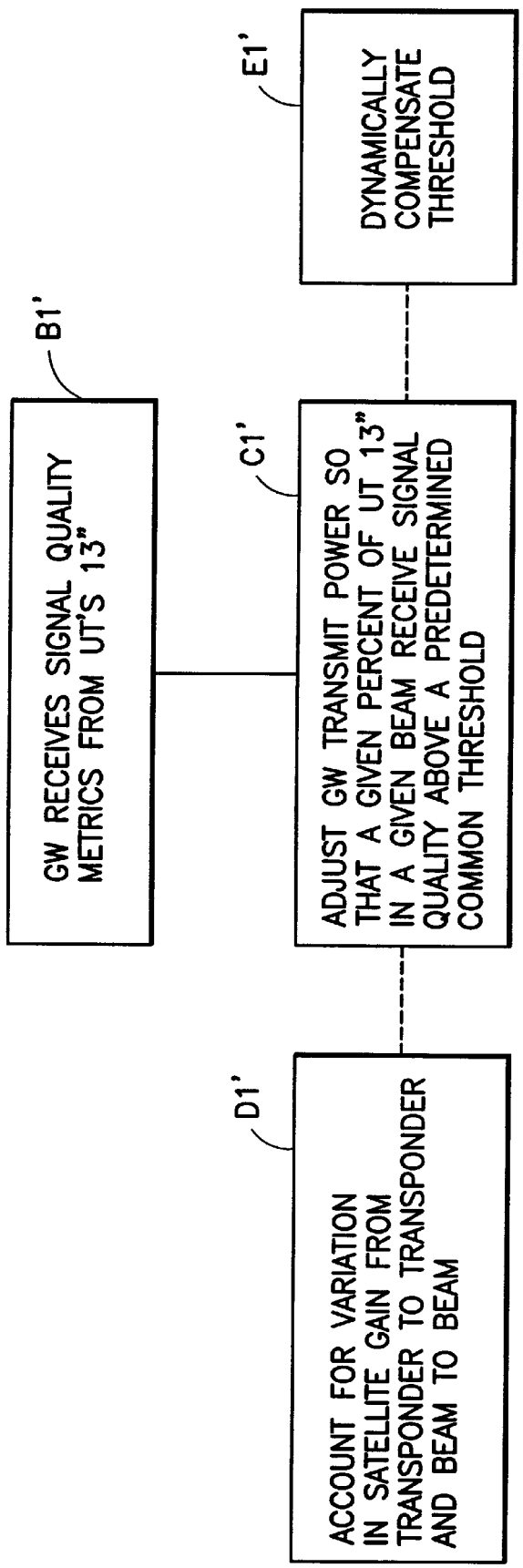

In accordance with this aspect of the invention the gateway power is adjusted in a process, as shown in FIG. 11A, in which the gateway 18 receives the reference signal quality metrics from the reference terminals 13", Step B1", and adjusts the transmit power, Step C1', and thus the signal quality for the multiplicity of terminals 13". This is accomplished so that a given percentage of the terminals in a single beam receive a signal quality above a specific, selectable threshold, independent of the location of the terminal in the beam or the type of terminal. In other words, the signal quality is established by a set threshold which is common for all terminal types in any location within a given downlink beam.

In another process in accordance with the present invention, the signal quality for the multiplicity of terminals 13" is adjusted by controlling gateway power as shown in the flow chart of FIG. 11B. Here, the gateway 18, based on the quality metrics received (i.e. Step B1") from the terminals 13", adjusts the transmit power, in Step C1", such that the signal quality of the reference signals received by a specific percentage of each of the various types of reference terminals 13" in a given beam is above a specific selectable threshold that is set independently for each of the types of reference terminals 13", independent of the location of the terminals in the beam. It is also within the scope of this invention that the gateway 18 adjusts the transmit power so that the signal quality received by the specified percentage of user terminals, of the type having the highest threshold from the thresholds set for each type, does not fall below this minimum threshold.

Further in accordance with this invention, the gateway 18 respectively adjusts the transmit power, in Step D1' of FIG. 11A and Step D1" of FIG. 11B, to account for any variation in satellite gain from transponder to transponder and beam to beam. In this case, the signal quality is adjusted in Step C1', FIG. 11A, such that at least the predetermined percentage of the reference terminals 13" in each beam of the satellite 12 covering the service area receive a signal quality above a predetermined threshold, regardless of type and location of the terminals within the beam. Otherwise, in Step C1" of FIG. 11B, at least the predetermined percentage of each type of the reference terminals 13" receive a signal quality above a predetermined threshold set which is independently for each of the types of reference terminals 13".

The gateway 18 communicating with a variety of different types of the user terminals in a given service area can employ either one of the above described power control methods independently or in combination. For example, the gateway transmit power may initially be adjusted (still in response to metrics from reference terminals 13") such that a given percentage of terminals receive a signal quality above a specific threshold (Step C1' of FIG. 11A). However, if satellite capacity is not sufficient then, the transmit power is adjusted such that a given percentage of terminals with the highest independent threshold receive a signal quality which is above that minimum threshold (Step C1" of FIG. 11B). If satellite capacity is still insufficient, the transmit power is further adjusted to account for variations in satellite gain from transponder to transponder and beam to beam (see Steps D1', D1", of FIGS. 11A, 11B).

It is still within the scope of this invention, to control the signal quality by adjusting the gateway transmit power substantially as described previously, except that the thresholds set in Steps C1', C1" are further compensated dynamically for position of the reference terminals 13" in the beam, shown in Steps E1', E2" of FIGS. 11A, 11B. As illustrated in FIG. 12, this case requires that the approximate position of the terminal 13" be determined by the gateway 18 Step G, and also that the substantially instantaneous beam pattern on the earth for feeder link and user link beams be known or estimated, Step H. The satellite beam pattern is established in accordance with the present invention as described in greater detail further below.

It is also within the scope of the present invention to further control the gateway transmit power similar to methods previously mentioned in connection with FIGS. 11–11B, 12 except that the threshold is further dynamically varied as the satellite 12 and its corresponding beams pass over a predetermined region of the earth. In this case the thresholds used in any of the aforementioned steps are dynamically varied to account for variation in the projected quality of service over the expected terrain in the service area in this predetermined region of the earth. For example, if the service area is in a region of the earth such that the service area contains a significant amount of jungle, this technique prevents a large amount of capacity being expended to cover difficult terrain.

It is also in accordance with this invention to create a history of the required gateway power over time in order to remove temporal variations due to rain and other signal impairments. By removing the temporal variations, the downlink power required to provide service to a particular geographic area may be determined using measured characteristics of the satellite, such as for example transponder gain. One method is to record the GW reference signal power as a function of time in order to determine the minimum amount of power to provide the desired signal quality. The minimum value will then provide the rain-free value.

The above described method can also be extended to use the reference terminals to establish the profiles of the satellite beams. As the satellite beams move over the service areas the relative position of the reference terminal in the beam as well as the relative amount of power in the reference signals or conversely the quality of the reference signals is measured while the reference signal power is maintained constant. After being established, the satellite beam patterns are then input to the gateway power control process (e.g. Step H, FIG. 12) as discussed previously.

While the invention has been particularly shown and described with respect to preferred embodiments and process steps thereof, it will be understood by those skilled in the art that the invention is not limited to only these particular methods and apparatus described in the preferred embodiments, or to only the process steps, the sequence of process steps, or in the structures depicted in the drawings. On the contrary, it is intended to cover all alternative, modifications, and equivalents as may be included within the spirit and scope of the invention defined by the appended claims. In particular, the scope of the invention is intended to include, for example, power control for ground based cellular communication system as well as medium earth orbit and geo-synchronous orbit satellite communication systems. In addition, other methods and devices embodying the present invention may be employed in other ground based or satellite data transfer systems with similar results.

What is claimed is:

1. A method for operating a satellite communication system having at least one satellite, at least one ground station, and at least one user terminal, comprising the steps of:

measuring a quality of at least one reference signal received by the user terminal, the reference signal being transmitted by the ground station through the satellite;

transmitting the measured quality of the reference signal received by the user terminal to the ground station;

comparing the measured quality with a predetermined reference; and adjusting a transmit power of the ground station in response to a difference between the predetermined reference and measured quality, wherein the transmit power of the ground station is adjusted so that a flux density of a downlink beam is substantially constant at the user terminal independent of the location of the user terminal in the beam.

2. A method as in claim 1, further comprising the steps of determining if available satellite capacity is sufficient when the ground station transmit power is adjusted so that the flux density of the downlink beam is substantially constant, and if satellite capacity is insufficient, adjusting ground station transmit power to compensate for predetermined variations in satellite gain and maintain flux density in the downlink beam at the user terminal above a predetermined threshold.

3. A method as in claim 1, wherein the user terminal is of a type having a known calibrated performance, and is at a known location in the downlink beam.

4. A satellite communication system comprised of at least one satellite and at least one ground station, said satellite communication system further comprising:

means for transmitting an uplink reference signal;

the satellite comprising a receiver for receiving the reference signal and further comprising a transmitter for transmitting the reference signal as a repeated downlink reference signal;

at least one user terminal with a receiver for receiving the reference signal repeated by the satellite, the user terminal having means for measuring a quality of the reference signal received by the user terminal, and having means for transmitting the measured quality; and a processor coupled to the ground station for adjusting a transmit power of the ground station based on the measured quality transmitted by the user terminal, the processor being programmed to at least one of adjust the transmit power such that a flux density of a downlink beam from the satellite is substantially constant at the user terminal independent of the location of the user terminal in the beam or adjust the transmit power to compensate for predicted variation in satellite gain and maintain the flux density of the beam above a predetermined threshold at the location of the user terminal.

5. A method for operating a satellite communication system having at least one satellite, at least one ground station, and a plurality of user terminals located in downlink beams of the satellite, the plurality of user terminals including a plurality of types of user terminals, the method comprising the steps of:

measuring a quality of reference signals received by the user terminals, the reference signals being transmitted by the ground station through the satellite;

transmitting the measured quality of the reference signals received by the user terminals to the ground station;

comparing the measured quality with a predetermined reference; and adjusting the transmit power of the ground station to at least one of provide a predetermined percentage of all user terminals in a given one of the downlink beams with downlink signal quality above a common predetermined threshold, or to provide a predetermined percentage of each type of user terminal in the beam with downlink signal quality above a corresponding predetermined threshold set independently for each type of user terminal.

6. A method as in claim 5, wherein the step of adjusting comprises holding the downlink signal quality for the predetermined percentage of user terminals of a type having the corresponding threshold which is a highest threshold from the thresholds set independently for each type of user terminal above the highest threshold.

7. A method as in claim 5, wherein the step of adjusting comprises accounting for variations in satellite gain between satellite transponder and between feeder link and user link beams of the satellite.

8. A method as in claim 5, wherein the step of adjusting comprises setting the at least one of the common threshold, or thresholds set independently for each type of user terminal to dynamically compensate for position of the user terminals receiving the reference signals in a given beam.

9. A method as in claim 5, further comprising the steps of determining profiles of satellite beam patterns in a service area of the satellite, and determining the location of at least one of the user terminals within one of the beam pattern profiles.

* * * * *